(12) United States Patent
Kezobo et al.

(10) Patent No.: US 11,338,844 B2
(45) Date of Patent: May 24, 2022

(54) ELECTRIC POWER STEERING APPARATUS

(71) Applicant: Mitsubishi Electric Corporation, Tokyo (JP)

(72) Inventors: Isao Kezobo, Tokyo (JP); Kenta Tanaka, Tokyo (JP); Masaharu Tanaka, Tokyo (JP); Akiyoshi Takashima, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 920 days.

(21) Appl. No.: 16/085,683

(22) PCT Filed: May 24, 2016

(86) PCT No.: PCT/JP2016/065287
§ 371 (c)(1),
(2) Date: Sep. 17, 2018

(87) PCT Pub. No.: WO2017/203595
PCT Pub. Date: Nov. 30, 2017

(65) Prior Publication Data
US 2019/0100234 A1    Apr. 4, 2019

(51) Int. Cl.
*B62D 5/04* (2006.01)
*B62D 6/00* (2006.01)
*B60W 10/20* (2006.01)
*B62D 6/10* (2006.01)

(52) U.S. Cl.
CPC .......... *B62D 5/0463* (2013.01); *B60W 10/20* (2013.01); *B62D 5/0472* (2013.01); *B62D 6/008* (2013.01); *B62D 6/10* (2013.01)

(58) Field of Classification Search
CPC .................................................. B62D 5/0463
See application file for complete search history.

(56) References Cited

U.S. PATENT DOCUMENTS

| 5,473,231 A | 12/1995 | McLaughlin et al. |
| 5,504,403 A | 4/1996 | McLaughlin |

(Continued)

FOREIGN PATENT DOCUMENTS

| EP | 2716522 A1 | 4/2014 |
| JP | 7-309250 A | 11/1995 |
| JP | 2002-029433 A | 1/2002 |

OTHER PUBLICATIONS

Communication dated May 16, 2019 from the European Patent Office in application No. 16903077.2.

*Primary Examiner* — Minnah L Seoh
*Assistant Examiner* — Conan D Duda
(74) *Attorney, Agent, or Firm* — Sughrue Mion, PLLC; Richard C. Turner

(57) ABSTRACT

An electric power steering apparatus includes a high-frequency compensation unit that outputs a high-frequency compensation signal obtained by filtering the high-frequency components of an assist torque command signal and multiplying the filtered high-frequency components by a gain; a corrected steering torque signal obtained by negatively or positively feeding back the high-frequency compensation signal to a steering torque signal is inputted to an assist torque command calculation unit; the assist torque command calculation unit outputs the assist torque command signal in accordance with the corrected steering torque signal.

9 Claims, 18 Drawing Sheets

(56) References Cited

U.S. PATENT DOCUMENTS

| | | | | |
|---|---|---|---|---|
| 6,107,767 | A * | 8/2000 | Lu | B62D 5/046 |
| | | | | 318/432 |
| 9,452,774 | B2 * | 9/2016 | Jang | B62D 5/0409 |
| 10,239,554 | B2 * | 3/2019 | Tsubaki | B62D 15/025 |
| 10,562,566 | B2 * | 2/2020 | Kim | B62D 5/0472 |
| 2005/0251311 | A1 * | 11/2005 | Burton | B62D 5/0463 |
| | | | | 701/41 |
| 2009/0192679 | A1 * | 7/2009 | Kobayashi | B62D 5/0466 |
| | | | | 701/42 |
| 2010/0004824 | A1 * | 1/2010 | Ikeda | B62D 5/0463 |
| | | | | 701/42 |
| 2011/0153162 | A1 * | 6/2011 | Kezobo | B62D 5/0472 |
| | | | | 701/42 |
| 2012/0175183 | A1 * | 7/2012 | Sakaguchi | B62D 5/0472 |
| | | | | 180/446 |
| 2014/0058630 | A1 * | 2/2014 | Kezobo | B62D 5/0472 |
| | | | | 701/42 |
| 2016/0200354 | A1 * | 7/2016 | Kimura | B62D 5/0472 |
| | | | | 701/42 |
| 2017/0072994 | A1 * | 3/2017 | Kim | B62D 5/0481 |
| 2017/0166244 | A1 * | 6/2017 | Ko | B62D 15/021 |
| 2017/0166245 | A1 * | 6/2017 | Kim | B62D 5/0463 |
| 2017/0183031 | A1 * | 6/2017 | Ko | B62D 6/008 |
| 2017/0203785 | A1 * | 7/2017 | Naik | B62D 5/049 |
| 2018/0170422 | A1 * | 6/2018 | Yoshida | B62D 5/0463 |
| 2018/0201306 | A1 * | 7/2018 | Tsubaki | B62D 1/286 |
| 2019/0002014 | A1 * | 1/2019 | Shah | B62D 5/0466 |
| 2019/0002019 | A1 * | 1/2019 | Tsubaki | B62D 5/0472 |
| 2019/0002022 | A1 * | 1/2019 | Kim | B62D 6/02 |
| 2019/0084613 | A1 * | 3/2019 | Tsubaki | H02P 23/0027 |
| 2019/0100234 | A1 * | 4/2019 | Kezobo | B62D 6/008 |

* cited by examiner

ELECTRIC POWER STEERING APPARATUS

CROSS REFERENCE TO RELATED APPLICATIONS

This application is a National Stage of International Application No. PCT/JP2016/065287 filed May 24, 2016.

TECHNICAL FIELD

The present invention relates to an electric power steering apparatus that outputs assist torque, based on a steering torque signal.

BACKGROUND ART

As is well known, in an electric power steering apparatus in which in accordance with steering torque exerted by a driver of a vehicle such as an automobile on the steering wheel of the vehicle, assist torque produced by a motor is provided to the steering system of the vehicle, the assist torque that is substantially proportional to the steering torque is determined and a torque proportional gain (referred to also as an assist gradient), which is an amplification factor for the proportional relationship between the steering torque and the assist torque, is set to a large value, so that the steering power of the driver is reduced and vibration such as an oscillation of the control system, which is caused when the torque proportional gain increases, is suppressed, thereby improving the driver's feeling.

To date, in an electric power steering apparatus provided with an assist curve for determining an assist torque command in accordance with a vehicle speed and input torque, i.e., steering torque, there has been disclosed an electric power steering apparatus in which there is provided a gradient detection circuit for calculating an instantaneous assist gradient of the assist torque command to the steering torque, from a vehicle speed, steering torque, and an output of the assist curve, and in which the polarity of a phase compensator is changed in such a way as to be substantially proportional to the instantaneous assist gradient (for example, refer to Patent Document 1). The conventional electric power steering apparatus disclosed in Patent Document 1 makes it possible that when the assist gradient is large, the gain crossover frequency in an open-loop transfer characteristic is lowered through phase-delay compensation so that sufficient stability is secured and when the assist gradient is small, an unnecessary gain decrease is suppressed so that the responsiveness is secured.

As an example of another conventional apparatus, there has been disclosed an electric power steering apparatus in which no assist gradient is calculated but steering torque and a vehicle speed are utilized instead of the assist gradient so that the frequency characteristic of a phase compensator can be changed in accordance with the magnitude of the steering torque and the vehicle speed (for example, refer to Patent Document 2). Because there exists an tendency that the assist gradient of an assist curve created by an assist torque command creation unit roughly becomes larger as the steering torque becomes larger, the conventional electric power steering apparatus disclosed in Patent Document 2 makes it possible to obtain an effect close to that of the conventional electric power steering apparatus disclosed in Patent Document 1, in which the polarity of the phase compensator can be changed based on the assist gradient.

PRIOR ART REFERENCE

Patent Document

[Patent Document 1] Japanese Patent Application Laid-Open No. H7-309250
[Patent Document 2] Japanese Patent Application Laid-Open No. 2002-029433

DISCLOSURE OF THE INVENTION

Problems to be Solved by the Invention

The control apparatus of the conventional electric power steering apparatus disclosed in Patent Document 1 calculates always in real time the assist gradient, which is the gradient of an assist curve created by the assist torque command creation unit, based on steering torque, an assist torque command, and a vehicle speed; thus, there has been a problem that the calculation amount is large and hence the load on a CPU is high. It is made possible that in order to avoid calculating in real time, a table for outputting the assist gradient for steering torque and a vehicle speed is preliminarily prepared; however, there has been a problem that because the table is multidimensional and the data amount is massive, the memory usage amount is excessively large.

In contrast, the control apparatus of the conventional electric power steering apparatus disclosed in Patent Document 2 does not utilize such a foregoing massive table for referring to an assist gradient from steering torque but replaces the assist gradient by a steering torque signal; therefore, in the case where in a region where steering torque is large, the assist gradient becomes small or in the case where the gradient changes depending on the vehicle speed, the assist gradient cannot accurately be obtained. Accordingly, a filter characteristic and a phase compensator suitable for the case where although the assist gradient is small, the assist torque is large are utilized or a filter characteristic and a phase compensator suitable for the case where although the assist gradient is large, the assist torque is small are utilized; thus, there has been a problem that the stability and the responsiveness are deteriorated.

The present invention has been implemented in order to solve the foregoing problems in the conventional electric power steering apparatuses; the objective thereof is to provide an electric power steering apparatus that has the stability and the responsiveness corresponding to an assist gradient, while suppressing the calculation load and the memory capacity

Means for Solving the Problems

An electric power steering apparatus according to the present invention includes a motor that outputs assist torque, based on a steering torque signal from a torque sensor for detecting steering torque, and a control apparatus to control the assist torque of the motor, the electric power steering apparatus is characterized in that the control apparatus includes an assist torque command calculator to calculate and output an assist torque command signal for making the motor generate the assist torque and a high-frequency compensator to output a high-frequency compensation signal obtained by filtering high-frequency components of the assist torque command signal and multiplying the filtered high-frequency components by a gain, and in that the assist torque command calculator receives a corrected steering torque signal produced by negatively or positively feeding back the high-frequency compensation signal to the steering torque signal and then outputs the assist torque command signal in accordance with the inputted corrected steering torque signal.

Advantage of the Invention

An electric power steering apparatus according to the present invention includes a motor that outputs assist torque, based on a steering torque signal from a torque sensor for detecting steering torque, and a control apparatus that controls the assist torque of the motor; the electric power steering apparatus is configured in such a way that the control apparatus includes an assist torque command calculator to calculate and output an assist torque command signal for making the motor generate the assist torque and a high-frequency compensator to output a high-frequency compensation signal obtained by filtering high-frequency components of the assist torque command signal and multiplying the filtered high-frequency components by a gain, and in such a way that the assist torque command calculator receives a corrected steering torque signal produced by negatively or positively feeding back the high-frequency compensation signal to the steering torque signal and then outputs the assist torque command signal in accordance with the inputted corrected steering torque signal. As a result, it is made possible that while the calculation load and the memory capacity are suppressed, the stability and the responsiveness are raised in accordance with the assist gradient.

BEST MODE FOR CARRYING OUT THE INVENTION

Embodiment 1

Figure 1:
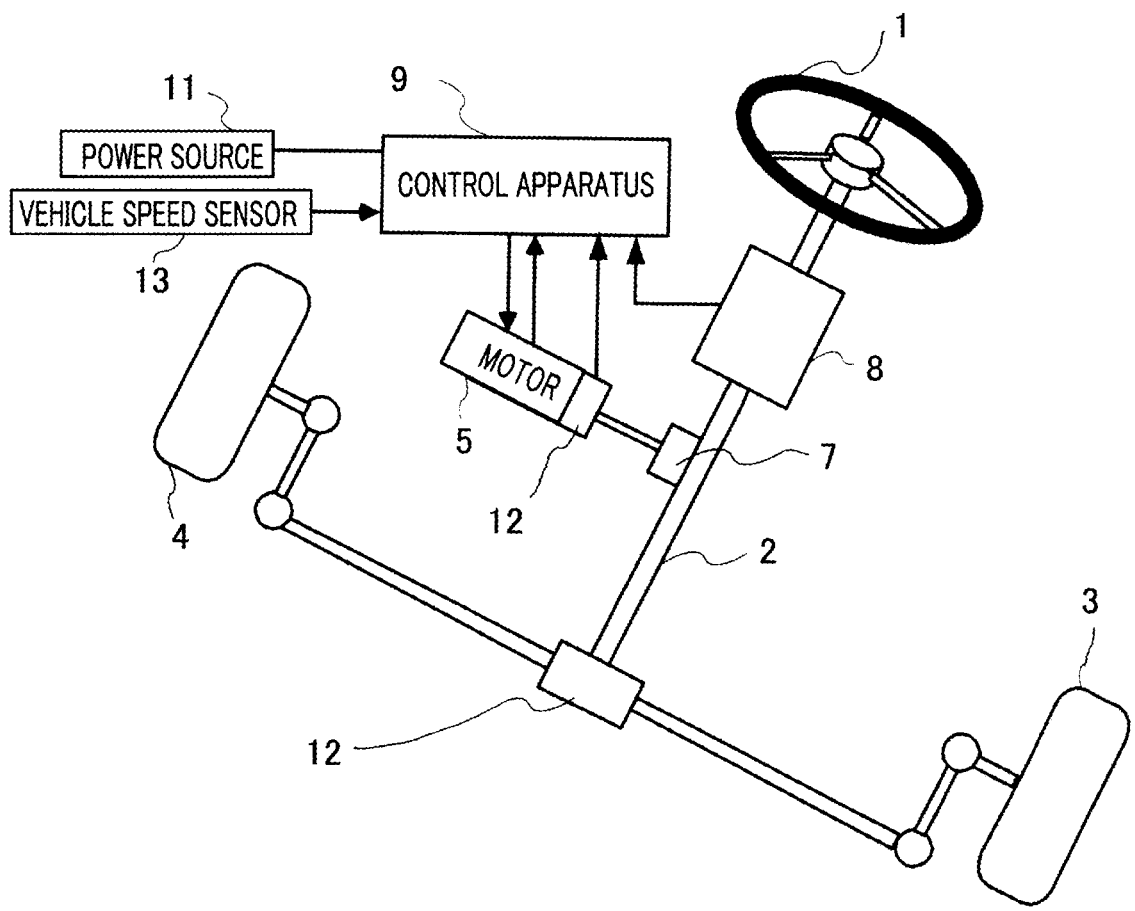
FIG. 1 is a configuration diagram representing the configuration of a vehicle steering system including an electric power steering apparatus according to each of Embodiments 1 thorough 5 of the present invention.

Hereinafter, an electric power steering apparatus according to Embodiment 1 of the present invention will be explained with reference to the accompanying drawings. FIG. 1 is a configuration diagram representing the configuration of a vehicle steering system including an electric power steering apparatus according to each of Embodiments 1 thorough 5 of the present invention. In FIG. 1, a vehicle steering system is provided with a steering wheel 1 to be operated by a vehicle driver, a steering shaft 2 coupled with the steering wheel 1, a rack-and-pinion gear 12 coupled with the steering shaft 2, and wheels 3 and 4 to be steered by the driver through the intermediary of the steering wheel 1, the steering shaft 2, and the rack-and-pinion gear 12.

Moreover, the vehicle steering system is provided with the electric power steering apparatus according to Embodiment 1 of the present invention. The electric power steering apparatus includes a motor 5 that generates assist torque for assisting the driver's steering, a speed reduction gear 7 that transfers the output of the motor 5 to the steering shaft 2, a torque sensor 8 that detects steering torque produced by the driver, a control apparatus 9 that drives the motor 5, based on steering torque detected by the torque sensor 8 and a vehicle speed detected by a vehicle speed sensor 13, and a motor rotation-angle sensor 6 that detects a rotation angle of the motor 5. A power source 11 configured with a battery mounted in the vehicle supplies electric power to the control apparatus 9 and the motor 5.

Figure 2:
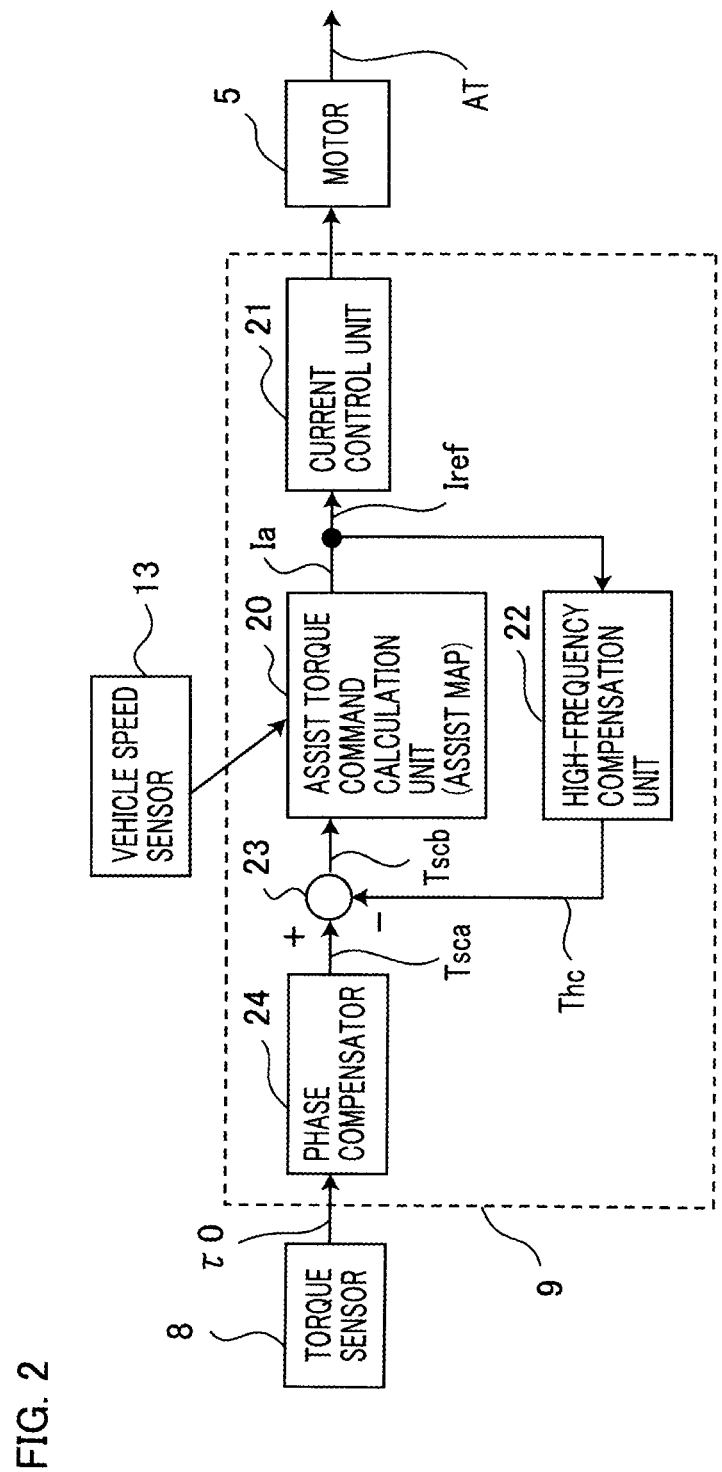
FIG. 2 is a block diagram representing the configuration of a control apparatus in the electric power steering apparatus according to Embodiment 1 of the present invention.

FIG. 2 is a block diagram representing the configuration of a control apparatus in the electric power steering apparatus according to Embodiment 1 of the present invention. In FIG. 2, the control apparatus 9 includes, as the constituent elements, an assist map as an assist torque command calculation unit 20 as an assist torque command calculator, a current control unit 21 as a current controller, a phase compensator 24 as a first phase compensator, a high-frequency compensation unit 22 as a high-frequency compensator, and a subtractor 23.

Figure 19:
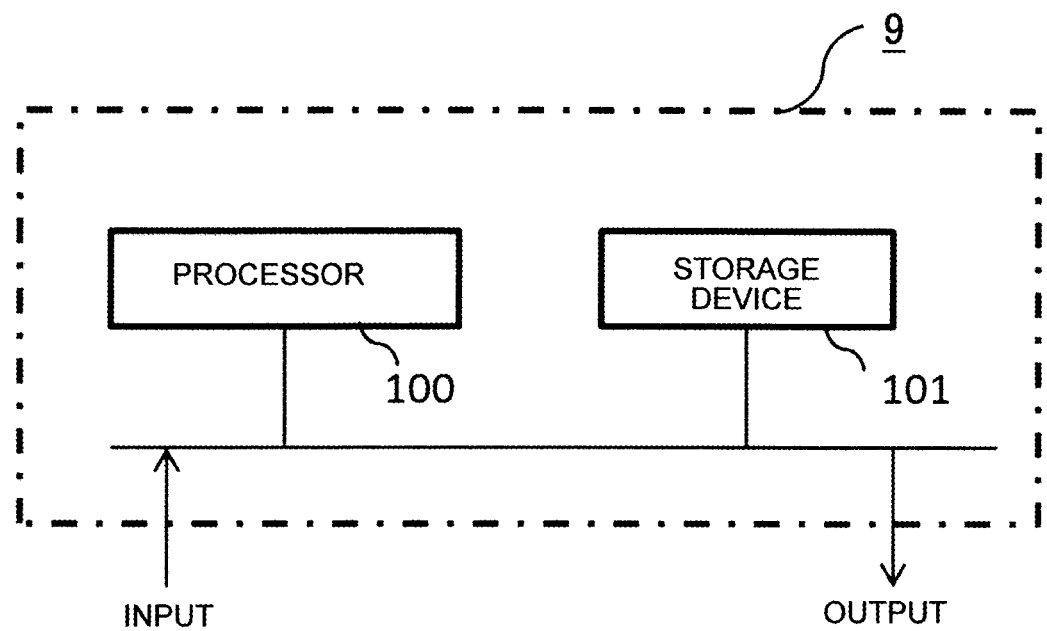

FIG. 19 shows an example of hardware of the control apparatus 9. The control apparatus 9 is composed of a processor 100 and a storage unit 101 as shown in FIG. 19. The storage unit 101 includes, although not shown, a volatile storage device such as a random access memory, and a nonvolatile auxiliary storage device such as a flash memory. The storage unit 101 may include, instead of a flash memory, an auxiliary storage device such as a hard disk. The processor 100 executes a program loaded from the storage unit 101. In this case, the program is loaded from the auxiliary storage device to the processor 100 via the volatile storage device. The processor 100 may output data of the calculation result and the like to the volatile storage device of the storage unit 101, or may store the data in the auxiliary storage device via the volatile storage device.

The constituent elements in the control apparatus 9 are configured as software for a microcomputer. The microcomputer includes a well-known central processing unit (hereinafter, referred to as a CPU), a read only memory (hereinafter, referred to as a ROM), a random access memory (hereinafter, referred to as a RAM), an interface (hereinafter, referred to as an IF), and the like; programs stored in the ROM are sequentially extracted so that the CPU performs desired calculations and then the calculation results are temporarily stored in the RAM, for example, so that the programs of the software are implemented and hence predetermined control operation is performed.

Next, the operation of the electric power steering apparatus according to Embodiment 1 of the present invention will be explained with reference to the drawings. In FIG. 1, steering torque exerted on the steering wheel 1 by an unillustrated driver is transferred from a torsion bar of the torque sensor 8 to a rack of the rack-and-pinion gear 12 through the intermediary of the steering shaft 2, so that the wheels 3 and 4 are steered.

Output torque produced by the motor 5 is transferred to the steering shaft 2 through the intermediary of the speed reduction gear 7 so as to reduce steering torque to be exerted by the driver during his steering. As the motor 5, for example, a DC motor or an AC motor such as a permanent-magnet synchronous motor or an induction motor is utilized.

The torque sensor 8 has a torsion bar and has a function of converting a twist angle of the torsion bar into an electric signal. When the driver steers the steering wheel 1 and hence steering torque is exerted on the torsion bar of the torque sensor 8, the torsion bar twists at an angle substantially proportional to the steering torque. The torque sensor 8 converts the twist angle of the torsion bar into an electric signal that is outputted as a steering torque signal $\tau 0$. The vehicle speed sensor 13 detects a traveling speed of the vehicle so as to output a vehicle speed signal Vx. In the explanation below, the steering torque signal $\tau 0$ may also be referred to simply as the "steering torque $\tau 0$"; the vehicle speed signal Vx may also be referred to simply as the "vehicle speed Vx".

In accordance with the steering torque $\tau 0$ detected by the torque sensor 8 and the vehicle speed Vx detected by the vehicle speed sensor 13, the control apparatus 9 creates, through calculation, a motor current command signal Iref corresponding to the direction and the value of the output torque of the motor 5 and controls the current of the motor 5, based on the created motor current command signal Iref. The motor 5 is driven based on the electric current controlled by the control apparatus 9 and exerts assist torque AT on the steering shaft 2 through the intermediary of the speed reduction gear 7.

Next, the operation of the control apparatus 9 will be explained in detail. In FIG. 2, the phase compensator 24 performs phase compensation in which for the steering torque $\tau 0$ detected by the torque sensor, the high-frequency gain is decreased or increased, and then obtains a compensated steering torque signal Tsca, the phase of which is compensated. The phase compensator 24 may also be referred to as a phase compensator. In this explanation, it is assumed that the phase compensator 24 is formed of a phase-advance compensator that has a function of increasing the phase characteristic at frequencies in the vicinity of the gain crossover frequency of the one-round transfer function in a closed-loop system related to the assist torque AT and that has a frequency characteristic, for example, represented in FIG. 3.

Figure 3:
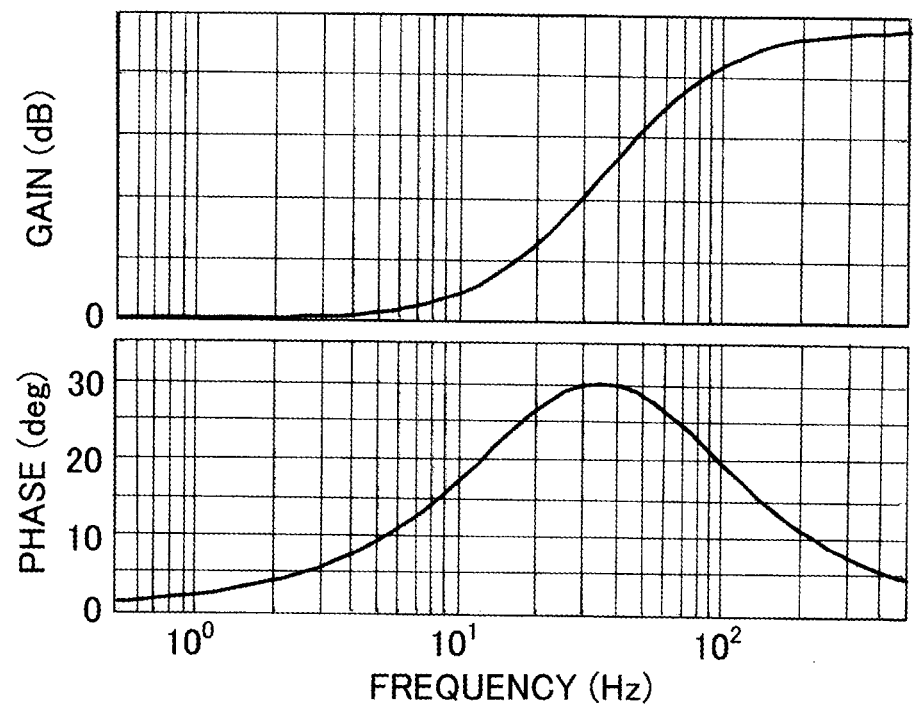
FIG. 3 is a bode chart representing the frequency characteristic of a phase-advance compensator, as a phase compensator, in the electric power steering apparatus according to Embodiment 1 of the present invention.

That is to say, FIG. 3 is a bode chart representing the frequency characteristic of a phase-advance compensator, as a phase compensator, in the electric power steering apparatus according to Embodiment 1 of the present invention; the ordinate denotes the phase [deg] and the gain [dB], and the abscissa denotes the frequency [Hz]. As represented in FIG. 3, a phase-advance compensator, as the phase compensator 24, has a function of increasing the phase characteristic at the frequencies 101 [Hz] through 102 [Hz] in the vicinity of the gain crossover frequency.

Next, the subtractor 23 subtracts a high-frequency compensation signal Thc from the high-frequency compensation unit 22, described later, from the compensated steering torque signal Tsca, so that the compensated steering torque signal Tsca is corrected and then a corrected steering torque signal Tscb is obtained. Based on the corrected steering torque signal Tscb, an assist map, as the assist torque command calculation unit 20, calculates an assist torque command signal Ia corresponding to the assist torque AT. The assist torque command signal Ia is referred to also as an assist current command signal; in this explanation, the term "assist torque command signal" is utilized.

In the electric power steering apparatus according to Embodiment 1, the assist torque command signal Ia directly becomes the motor current command signal Iref; in addition to that, the assist torque command signal Ia may be corrected by adding a correction value obtained through commonly utilized compensation control—for example, inertia compensation control in which in the steering frequency, an effect of motor-inertia increase is compensated, viscosity compensation control for raising the viscosity, or the like—to the assist torque command signal Ia or by subtracting the correction value from the assist torque command signal Ia.

The vehicle speed signal Vx is also inputted to the assist map as the assist torque command calculation unit 20; a vehicle speed changes the input/output characteristic of the assist map.

Figure 4:
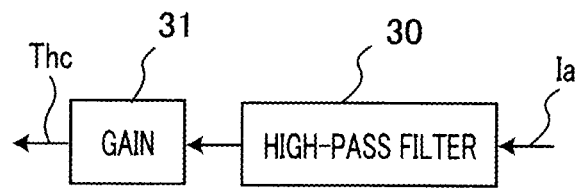
FIG. 4 is a block diagram representing the configuration of a high-frequency compensation unit in the electric power steering apparatus according to each of Embodiments 1 through 5 of the present invention.

Next, creation of the high-frequency compensation signal Thc by the high-frequency compensation unit 22 will be explained. The assist torque command signal Ia is inputted to the high-frequency compensation unit 22. Based on the inputted assist torque command signal Ia, the high-frequency compensation unit 22 creates the high-frequency compensation signal Thc. FIG. 4 is a block diagram representing the configuration of the high-frequency compensation unit in the electric power steering apparatus according to each of Embodiments 1 through 5 of the present invention. As represented in FIG. 4, the high-frequency compensation unit 22 includes a high-pass filter 30 and a gain 31.

In FIG. 4, the high-frequency components of the assist torque command signal Ia are filtered through the high-pass filter 30 without being attenuated; the high-pass filter 30 attenuates the low-frequency components thereof. As the high-pass filter 30, a first-order filter HPF(s) having a transfer function expressed by the equation (1) below may be utilized. The high-frequency components, here, denotes frequency components having respective frequencies higher than the cut-off frequency $\omega h$ of the high-pass filter 30.

$$HPF(s)=s/(s+\omega h) \tag{1}$$

where s is the Laplace operator.

The gain 31 multiplies the output of the high-pass filter 30 by a gain k and then outputs the result of the multiplication as the high-frequency compensation signal Thc. The high-frequency compensation signal Thc is expressed by the equation (2) below.

$$Thc=k\cdot s/(s+\omega h) \; Ia \tag{2}$$

Next, the assist torque command signal Ia calculated by the assist torque command calculation unit 20 is directly inputted, as the motor current command signal Iref, to the current control unit 21. The current control unit 21 controls the motor current so that the motor current coincide with the inputted motor current command signal Iref. Specifically, the current control unit 21 has an H-bridge circuit configured, for example, with semiconductor switching devices or a driving circuit formed of an inverter circuit; the current control unit 21 compares the inputted motor current command signal Iref with the motor current actually flowing in the motor and then controls the switching devices in the driving circuit so that the difference between the motor current command signal Iref and the motor current actually flowing in the motor becomes "zero". The driving circuit is PWM-controlled, for example, by a PWM (Pulse Width Modulation) signal, as a voltage command, corresponding to the motor current command signal Iref and then supplies a driving current to the motor 5. The motor 5 generates the assist torque AT, as output torque corresponding to the supplied driving current.

Next, phase compensation that corresponds to the assist gradient will be explained. As described above, the high-frequency compensation signal Thc, which is a signal obtained by multiplying the high-frequency components of the assist torque command signal Ia by the gain k, is negatively fed back to the compensated steering torque signal Tsca by the subtractor 23, so that the corrected steering torque signal Tscb is created. As part of the corrected steering torque signal Tscb created via the subtractor 23, the high-frequency components of the compensated steering torque signal Tsca accompanies the compensated steering torque signal Tsca and is inputted to the assist map, as the assist torque command calculation unit 20.

The assist map, as the assist torque command calculation unit 20, is configured in a non-linear manner, in general. The torque proportional gain, which is an amplification factor at the operating point of the assist map, is referred to as an assist gradient, in this explanation. The corrected steering torque signal Tscb inputted to the assist torque command calculation unit 20 is amplified in accordance with the assist gradient of the assist map and then is outputted, as the assist torque command signal Ia, from the assist torque command calculation unit 20. The high-frequency components, which as part of the corrected steering torque signal Tscb, have accompanied the compensated steering torque signal Tsca and then have been inputted to the assist torque command calculation unit 20, as described above, is included, as the high-frequency components, in the assist torque command signal Ia outputted from the assist torque command calculation unit 20 and is again inputted to the high-frequency compensation unit 22.

As described above, in the control apparatus 9, there is configured a loop in which the high-frequency components of the compensated steering torque signal Tsca, as an input, are repeatedly processed by the assist torque command calculation unit 20, so that only the high-frequency components are repeatedly processed by the assist torque command calculation unit 20.

In contrast, because passing through the high-pass filter 30 of the high-frequency compensation unit 22, the low-frequency components are attenuated and hence hardly undergo the effect of the high-frequency compensation signal Thc. Accordingly, the low-frequency components of the compensated steering torque signal Tsca do not repeatedly undergo the effect of the assist map as the assist torque command calculation unit 20 but are simply amplified based on the assist gradient of the assist map so as to become the low-frequency components of the assist torque command signal Ia.

As described above, the respective effects of the assist gradient of the assist map, as the assist torque command calculation unit 20, to the high-frequency components and the low-frequency components are different from each other; therefore, the frequency response of the phase compensation characteristic from the compensated steering torque signal Tsca to the assist torque command signal Ia can be changed in accordance with the assist gradient.

The high-frequency components of the compensated steering torque signal Tsca are negatively fed back to the compensated steering torque signal Tsca itself via the assist map, as the assist torque command calculation unit 20, and the high-frequency compensation unit 22, so that the high-frequency components are subtracted from the compensated steering torque signal Tsca; thus, the characteristic from the compensated steering torque signal Tsca to the assist torque command signal Ia basically becomes a characteristic obtained by multiplying the phase delay compensation characteristic by the assist gain. The phase delay compensation characteristic can be changed in accordance with the assist gradient.

Figure 5:
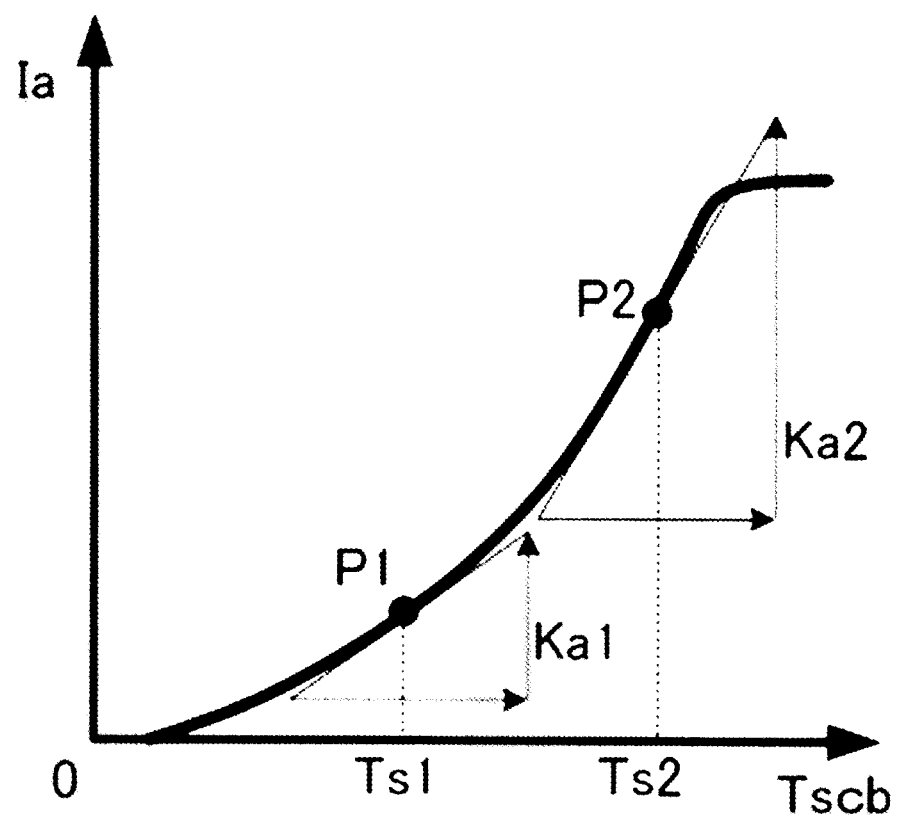
FIG. 5 is an input/output characteristic chart representing the characteristic of an assist map in the electric power steering apparatus according to each of Embodiments 1 through 5 of the present invention.

FIG. 5 is an input/output characteristic chart representing the characteristic of an assist map in the electric power steering apparatus according to each of Embodiments 1 through 5 of the present invention; FIG. 5 represents the input/output characteristic of the assist map at a certain vehicle speed. In FIG. 5, the ordinate denotes the assist torque command signal Ia, and the abscissa denotes the corrected steering torque signal Tscb. When for example, the corrected steering torque signal Tscb is Ts1, the operating point is P1. The instantaneous gradient, at that time, of the assist torque command signal Ia with respect to the corrected steering torque signal Tscb is an assist gradient Ka1, as the torque proportional gain at the operating point P1. In the case of another operating point, for example, the operation point P2 at a time when the corrected steering torque signal Tscb is Ts2, for example, the value of an assist gradient Ka2 as the torque proportional gain is larger than that of the assist gradient Ka1 as the torque proportional gain at the operating point P1.

As described above, the low-frequency components of the compensated steering torque signal Tsca do not repeatedly undergo the effect of the assist map but are simply amplified based on the assist gradient so as to become the low-frequency components of the assist torque command signal Ia; therefore, in the case of the operating point P1 of the assist torque map, the value of the low-frequency components of the assist torque command signal Ia is a value obtained by multiplying the low-frequency components of the compensated steering torque signal Tsca by the assist gradient Ka1; in the case of the operating point P2, the value of the low-frequency components of the assist torque command signal Ia is a value obtained by multiplying the low-frequency components of the compensated steering torque signal Tsca by the assist gradient Ka2, which is larger than the assist gradient Ka1 at the operating point P1.

In contrast, with regard to the high-frequency components of the compensated steering torque signal Tsca, the operating point of the assist map is determined depending on the low-frequency components thereof; in the case of the operating point P1, the high-frequency components of the assist torque command signal Ia takes a value obtained by multiplying the corrected steering torque signal Tscb by the assist gradient Ka1 and is again subtracted, as the high-frequency compensation signal Thc, from the compensated steering torque signal Tsca so as to be repeatedly multiplied by the assist gradient Ka1. In the case of the operating point P2, the high-frequency components of the assist torque command signal Ia takes a value obtained by multiplying the corrected steering torque signal Tscb by the assist gradient Ka2, which is larger than the assist gradient Ka1. Accordingly, with regard to the high-frequency components of the compensated steering torque signal Tsca, the high-frequency compensation signal Thc becomes larger and hence the amount of subtraction by the subtractor 23 also becomes larger, as the assist gradient is larger; thus, the phase delay compensation effect from the compensated steering torque signal Tsca to the assist torque command signal Ia becomes large.

Figure 6:
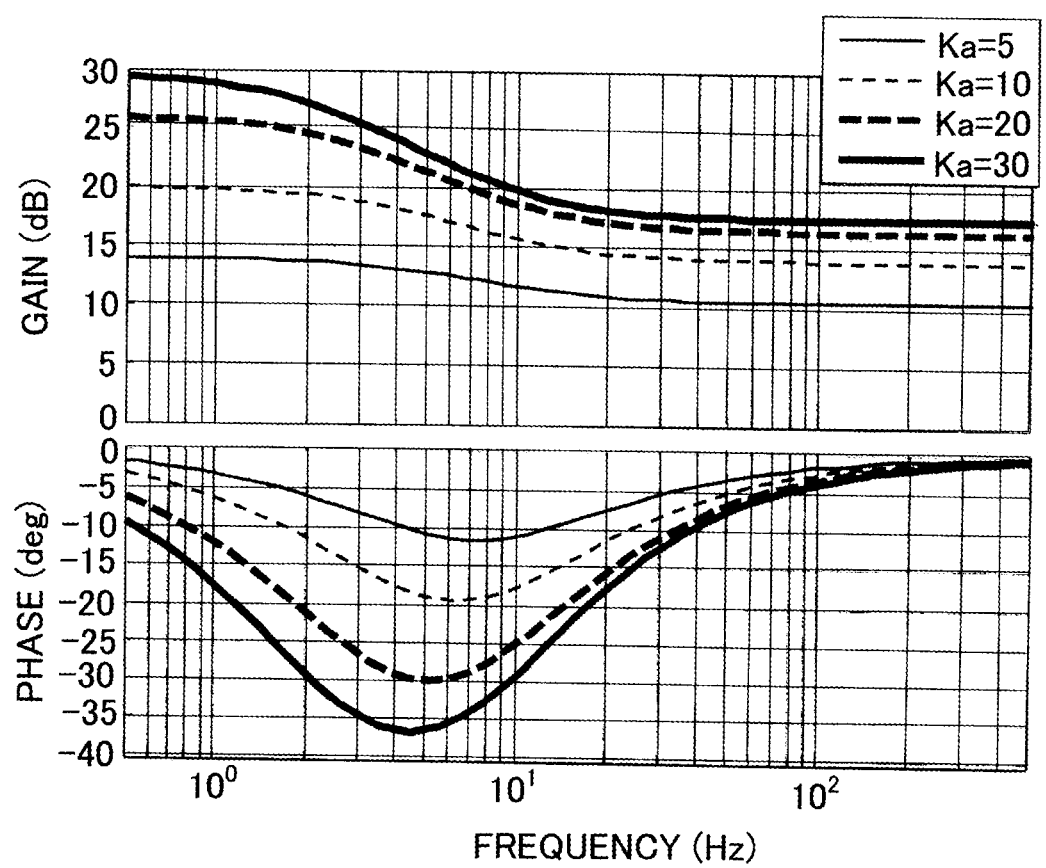
FIG. 6 is a bode chart representing the transfer characteristic from a compensated steering torque signal to an assist torque command signal in the electric power steering apparatus according to Embodiment 1 of the present invention.

FIG. 6 is a bode chart representing the transfer characteristic from a compensated steering torque signal to an assist torque command signal in the electric power steering apparatus according to Embodiment 1 of the present invention; FIG. 6 represents the frequency responsiveness of the transfer characteristic from the compensated steering torque signal Tsca to the assist torque command signal Ia; the ordinate denotes the phase [deg] and the gain [dB], and the abscissa denotes the frequency [Hz]. The narrow solid line represents the phase [deg] and the gain [dB] at a time when the assist gradient Ka is "5"; the narrow broken line represents the phase [deg] and the gain [dB] at a time when the assist gradient Ka is "10"; the thick broken line represents the phase [deg] and the gain [dB] at a time when the assist gradient Ka is "20"; the thick solid line represents the phase [deg] and the gain [dB] at a time when the assist gradient Ka is "30".

As represented in FIG. 6, in the low-frequency band of 1 [Hz] or lower, the magnitude of the gain characteristic takes a value substantially in accordance with the assist gradient Ka and increases, as the assist gradient Ka increases. In contrast, in the high-frequency band, the gain falling amount and the phase delay amount become larger, as the assist gradient Ka are larger, in comparison with the case of the low-frequency band; thus, it can be seen that the phase delay compensation effect changes in accordance with the assist gradient.

Figure 7:
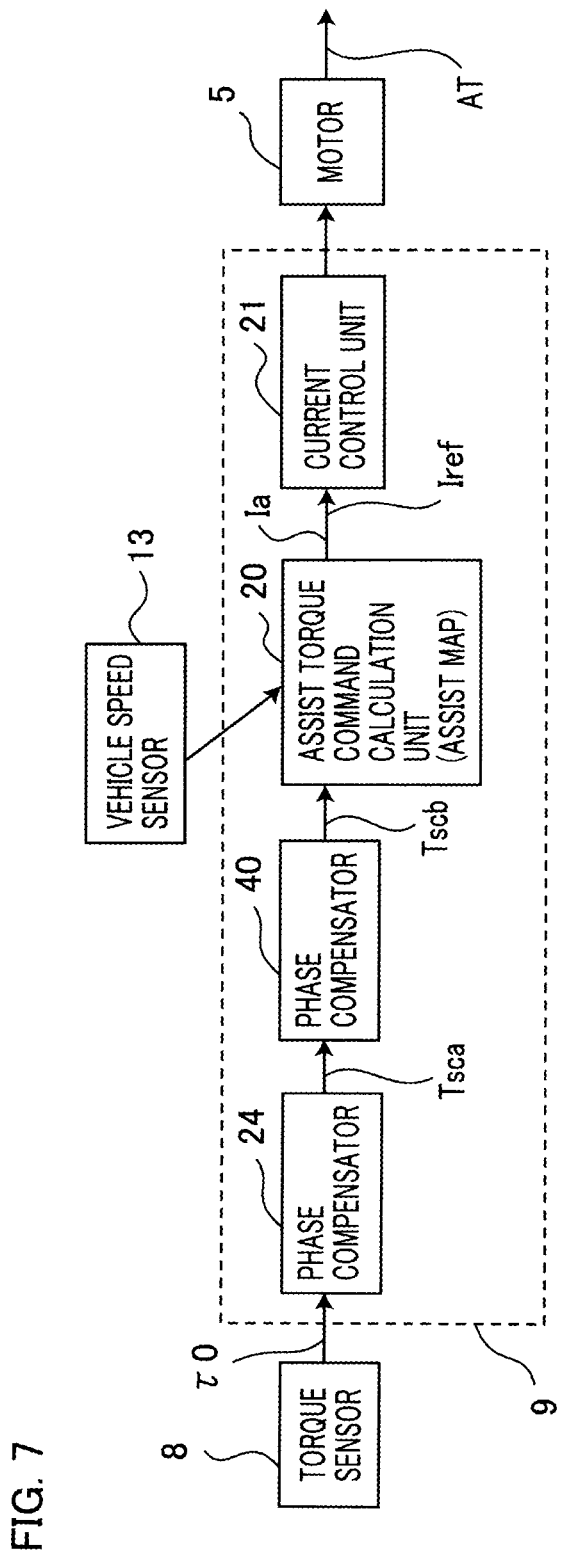
FIG. 7 is a block diagram representing the configuration of a control apparatus in a conventional electric power steering apparatus.
Figure 8:
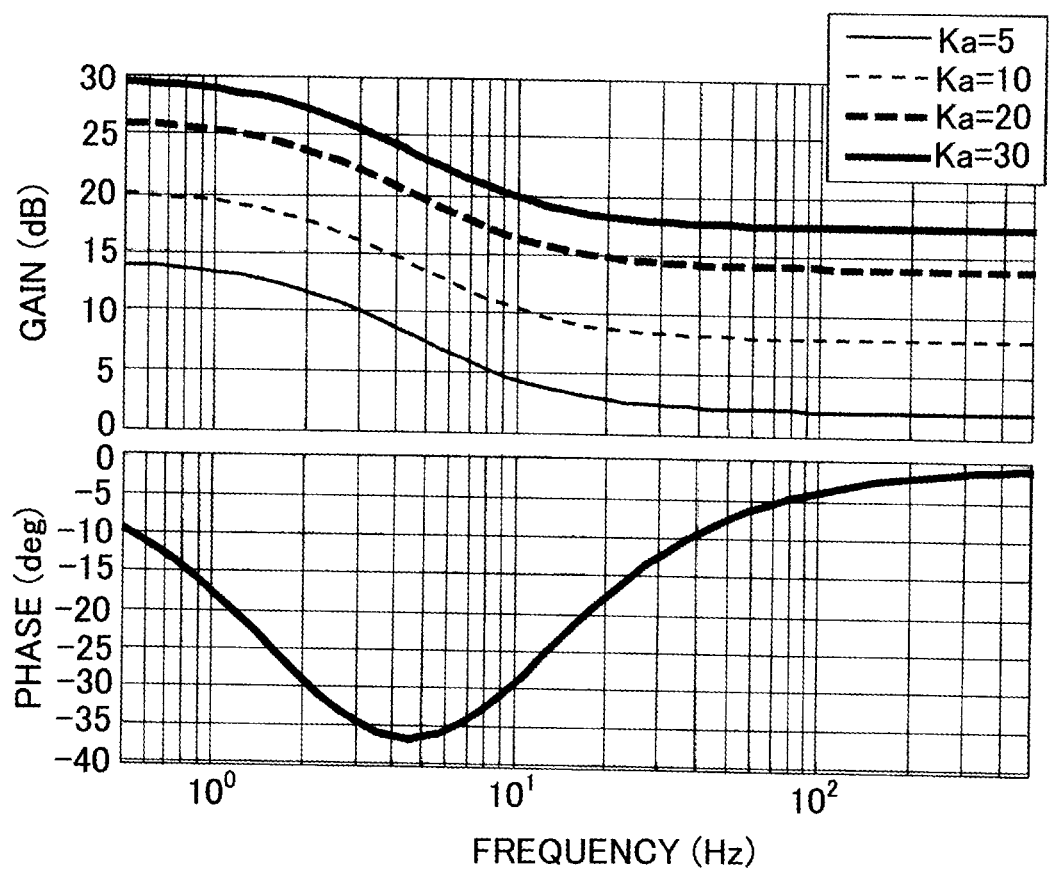
FIG. 8 is a bode chart representing the transfer characteristic from a steering torque signal to an assist torque command signal in the conventional electric power steering apparatus.

FIG. 7 is a block diagram representing the configuration of a control apparatus in a conventional electric power steering apparatus; FIG. 7 represents an example of configuration in which a phase compensator 40 having a fixed characteristic is utilized. Reference characters the same as those in FIG. 2 denote the same or equivalent constituent elements. FIG. 8 is abode chart representing the transfer characteristic from a steering torque signal to an assist torque command signal in the conventional electric power steering apparatus. In the example of conventional apparatus represented in FIGS. 7 and 8, the phase delay compensation effect from the compensated steering torque signal Tsca to the assist torque command signal Ia is obtained by use of the phase compensator 40 having a fixed characteristic. Accordingly, unlike the electric power steering apparatus according to Embodiment 1 of the present invention, in the case of the conventional apparatus represented in FIG. 7, as represented in FIG. 8, the gain falling amount and the phase delay amount in the high-frequency band do not depend on the assist gradient but become constant, in comparison with those in the low-frequency band.

Next, the transfer function from the compensated steering torque signal Tsca to the assist torque command signal Ia in the electric power steering apparatus according to Embodiment 1 of the present invention will be explained by use of a mathematical expression in such a way as to be related to the assist gradient Ka of the assist map. The corrected steering torque signal Tscb obtained by negatively feeding back the high-frequency compensation signal Thc to the compensated steering torque signal Tsca can be expressed by the equation (3) below.

$$Tscb = Tsca - Thc \quad (3)$$

When it is assumed that a certain operating point lies on an assist map and the assist gradient at that time is Ka, the relationship between the corrected steering torque signal Tscb and the assist torque command signal Ia can be expressed by the equation (4) below, with regard to a minute operating-point change from the foregoing operating point.

$$Ia = Ka \cdot Tscb \quad (4)$$

By substituting the foregoing equations (2) and (4) for the equation (3) and rearranging it, the transfer function Ga(s) from the compensated steering torque signal Tsca to the assist torque command signal Ia can be expressed by the equation (5) below.

$$Ga(s) = Ka \cdot (s + \omega h) / \{(1 + k \cdot Ka) \cdot s + \omega h\} \quad (5)$$

where the input/output relational equation of the transfer function Ga(s) is given by the equation below.

$$Ia = Ga(s) \cdot Tsca \quad (6)$$

The foregoing frequency characteristic represented in FIG. 6 is exactly the one obtained by plotting the values of the equation (5); the denominator $\{(1+k \cdot Ka) \cdot s + \omega h\}$ of the transfer function Ga(s), expressed by the equation (5), from the compensated steering torque signal Tsca to the assist torque command signal Ia includes the assist gradient Ka and the pole thereof can be expressed by the equation (7) below.

$$\omega h/(1+k \cdot Ka) \quad (7)$$

It can be seen that the phase compensation characteristic from the compensated steering torque signal Tsca to the assist torque command signal Ia changes depending on the assist gradient Ka. Because the zero point of the numerator of the foregoing equation (5) is the cut-off frequency $\omega h$ of the high-pass filter 30 and is fixed, the break-point frequency, at the high-frequency side, of the phase delay compensation characteristic is constant for the assist gradient. The pole indicates the break-point frequency, at the low-frequency side, of the phase delay compensation characteristic; the larger the assist gradient Ka is, the lower the break-point frequency becomes. Therefore, the phase compensation characteristic from the compensated steering torque signal Tsca to the assist torque command signal Ia has a feature that the larger the assist gradient Ka is, the larger the gain falling amount and the phase delay amount in the high-frequency band become, in comparison with those in the low-frequency band.

Figure 9:
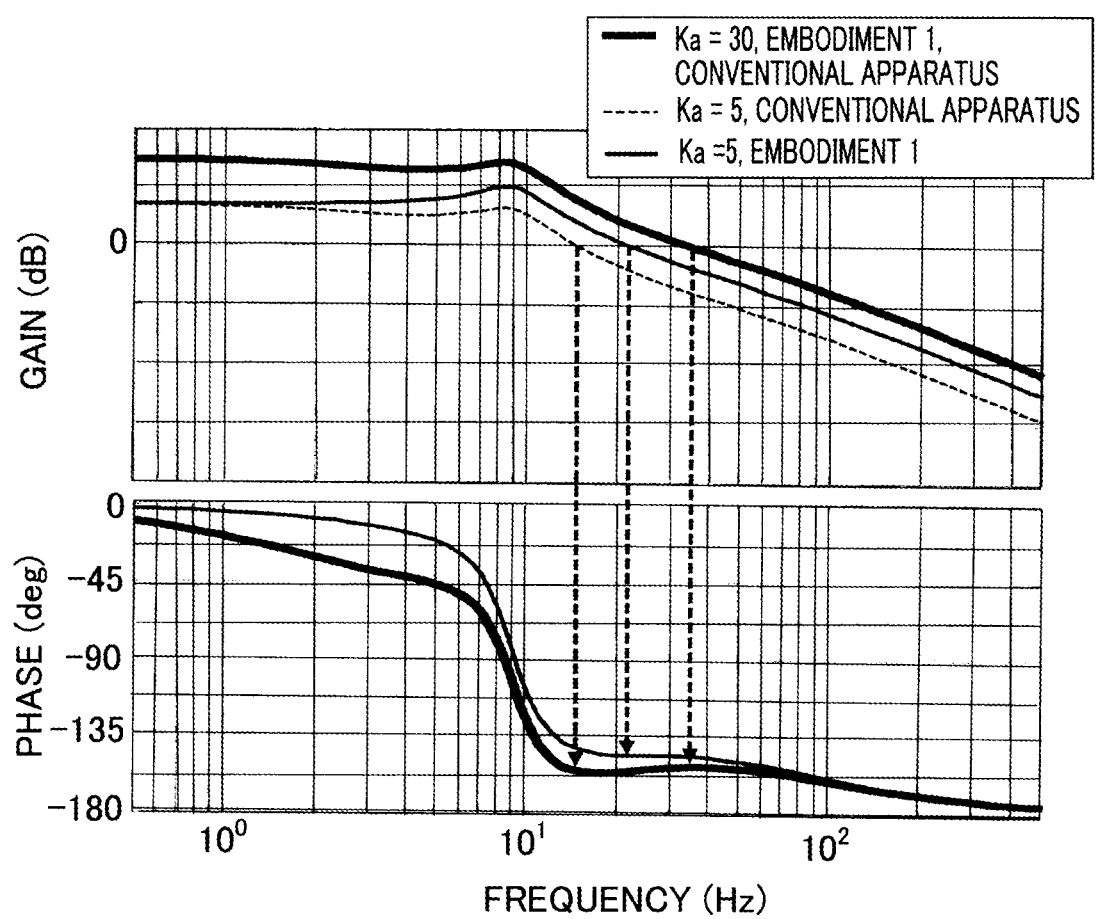
FIG. 9 is a bode chart representing, in a comparison manner, the respective open-loop transfer functions in the electric power steering apparatus according to Embodiment 1 of the present invention and the conventional electric power steering apparatus.

Next, the effect of the electric power steering apparatus according to Embodiment 1 of the present invention is explained by use of an open-loop transfer function in a closed-loop system related to the assist torque. FIG. 9 is a bode chart representing, in a comparison manner, the respective open-loop transfer functions in the electric power steering apparatus according to Embodiment 1 of the present invention and the conventional electric power steering apparatus. In FIG. 9, the ordinate denotes the phase [deg] and the gain [dB], and the abscissa denotes the frequency [Hz]; the thick solid line denotes the one-round transfer function according to the configuration of Embodiment 1 of the present invention and the one-round transfer function according to the configuration of the conventional apparatus represented in FIG. 7 at a time when the assist gradient Ka is 30; the respective configurations of Embodiment 1 and the conventional apparatus are designed in such a way as to have the same characteristic.

The phase compensator 24 in the configuration of Embodiment 1 of the present invention is formed, as a phase-advance compensator, in such a way as to have a characteristic represented in FIG. 3, as described above; the phase compensator 24 in the configuration of the conventional apparatus represented in FIG. 7 is configured in the same manner. As represented in FIG. 9, the gain crossover frequency at a time when the assist gradient Ka is "30" is substantially 35 [Hz]; the phase compensator 24 is designed in such a way that the maximum phase advance amount is obtained at this frequency.

The phase compensation characteristic from the compensated steering torque signal Tsca to the assist torque command signal Ia in the configuration according to Embodiment 1 of the present invention is designed in such a way that as represented in FIG. 6, the gain sufficiently decreases at the high frequencies in the vicinity of the gain crossover frequency so that at a time when the assist gradient Ka is "30", the gain crossover frequency does not become excessively high. The phase compensation characteristic from the compensated steering torque signal Tsca to the assist torque command signal Ia in the configuration of the conventional apparatus represented in FIG. 8 is designed in such a way that at a time when the assist gradient Ka is "30", the character is the same as that of the configuration of Embodiment of the present invention.

As described above, in the one-round transfer function at a time when the assist gradient Ka is large, for example, "30", the phase advance amount at the gain crossover frequency is large, as represented in FIG. 9, and hence the margin for the phase advance amount is sufficiently secured.

At first, the one-round transfer function in the conventional apparatus at a time when the assist gradient Ka is small, for example, "5" will be explained. Because in the configuration of the conventional apparatus, the phase compensation characteristic is constant for the assist gradient Ka, the frequency characteristic of the control apparatus is simply proportional to the assist gradient Ka, and the one-round transfer function is also simply proportional to the assist gradient Ka. As a result, the gain chart in the configuration of the conventional apparatus shifts in parallel by an amount corresponding to the decrease in the assist gradient Ka, and the phase characteristic becomes constant without depending on the assist gradient Ka.

Accordingly, the one-round transfer function in the conventional apparatus at a time when the assist gradient Ka is small, for example, "5" is represented by a narrow broken line in FIG. 9; it can be seen that in the low-frequency band of 10 [Hz] or lower, the phase-delay compensation is so effective that the gain is low and the phase is delayed, and hence the steering responsiveness is low. Furthermore, the phase-delay compensation is so effective that the gain crossover frequency falls down to a frequency at which the phase characteristic becomes minimum and hence the phase margin decreases in comparison with the case where the assist gradient Ka is "30".

Next, the one-round transfer function in the configuration of Embodiment 1 of the present invention at a time when the assist gradient Ka is small, for example, "5" will be explained. With regard to the phase compensation characteristic from the compensated steering torque signal Tsca to the assist torque command signal Ia in the configuration of Embodiment 1 of the present invention, as represented in FIG. 6, when the assist gradient Ka is small, the phase-delay effect is small, and hence the gain decrease and the phase delay amount in the high-frequency band is small. Accordingly, with regard to the one-round transfer function, as represented by the thick solid line in FIG. 9, in the low-frequency band of 10 [Hz] or lower, the gain characteristic and the phase are larger than those in the conventional apparatus represented by the broken line; thus, it can be seen that the steering responsiveness is high. Moreover, it can be seen that because when the assist gradient Ka is small, the phase delay amount of the control apparatus can be decreased, the delay in the phase characteristic of the one-round transfer function is small and hence the phase margin at the gain crossover frequency is raised in comparison with that in the conventional apparatus.

The steering responsiveness denotes the speed at which the actual steering angle responds when a driver inputs steering torque to the steering wheel. The higher the responsiveness of the assist torque to steering torque is, the higher the steering responsiveness is; when described with the one-round transfer function, the steering responsiveness becomes higher, as the gain and the phase are higher in the low-frequency band of substantially 10 [Hz] or lower.

As described above, when compared with the conventional apparatus that is designed in such a way that the characteristic of the phase compensation at a time when the assist gradient is large becomes optimum, the configuration of Embodiment 1 of the present invention can obtain an effect that while when the assist gradient is large, the safety margins such as the phase margin and the gain margin the same as those of the conventional apparatus are secured, the steering responsiveness and the phase margin can be raised when the assist gradient is small, in comparison with the conventional apparatus.

Moreover, when in the conventional apparatus, the characteristic of the phase compensation is designed in such a way as to be optimum at a time when the assist gradient is small, the high-frequency gain cannot sufficiently be reduced when the assist gradient is large; thus, the gain crossover frequency increases and the phase margin decreases; however, the configuration of Embodiment 1 of the present invention makes it possible that as the assist gradient is larger, the falling amount of the high-frequency gain is increased more, in comparison with the low-frequency band; thus, there can be obtained an effect that the gain crossover frequency can be suppressed from increasing and hence the phase margin can sufficiently be secured.

As described above, the electric power steering apparatus according to Embodiment 1 of the present invention includes the assist torque command calculation unit that outputs the assist torque command signal, and the high-frequency compensation unit that outputs the high-frequency compensation signal obtained by filtering the high-frequency components of the assist torque command signal and multiplying the filtered high-frequency components by a gain; a corrected steering torque signal obtained by negatively feeding back the high-frequency compensation signal to the steering torque signal is inputted to the assist torque command calculation unit; the assist torque command calculation unit outputs the assist torque command signal in accordance with the corrected steering torque signal. Thus, the frequency characteristic of the phase compensation characteristic from the steering torque signal to the assist torque command signal can be changed in accordance with the assist gradient in the assist torque command calculation unit; as a result, there can be obtained an prominent effect that in comparison with the conventional apparatus utilizing an ordinary phase compensator that does not change in accordance with the assist gradient, the steering responsiveness and the stability are raised.

Moreover, the foregoing extremely simple configuration including the high-frequency compensation unit and the negative feedback makes it possible that the calculation amount is the same as that of a conventional ordinary phase compensator that does not change in according with the assist gradient; therefore, there can be obtained a prominent effect that in comparison with the conventional apparatus, disclosed in Patent Document 1, that requires a lot of calculation such as successive calculation of the assist gradient, the calculation amount can largely be reduced.

Furthermore, in the case where as the conventional apparatus disclosed in Patent Document 2, the assist gradient is replaced by the steering torque signal, there has been a problem that the stability and the responsiveness are deteriorated at an operating point where the correlation between the assist gradient and the steering torque is low; however, the electric power steering apparatus according to Embodiment 1 of the present invention makes it possible to change the phase compensation characteristic in accordance with the assist gradient itself; thus, there can be obtained an effect that the stability and the responsiveness are not deteriorated.

Because the electric power steering apparatus according to Embodiment 1 of the present invention is configured in such a way that there is provided the phase compensator 24 that outputs the compensated steering torque signal obtained by compensating the phase of the steering torque signal and in such a way that after phase-compensated, the high-frequency compensation signal is negatively fed back to the compensated steering torque signal, phase-delay advancing compensation can be implemented by combining the phase delay compensation characteristic, realized by the high-frequency compensation unit, from the compensated steering torque signal Tsca to the assist torque command signal Ia with the phase advance characteristic obtained through the phase compensator that performs phase compensation of the steering torque signal; thus, there can be obtained an unprecedented prominent effect that the stability can be raised by lowering the gain crossover frequency so as to increase the phase margin.

Embodiment 2

Figure 10:
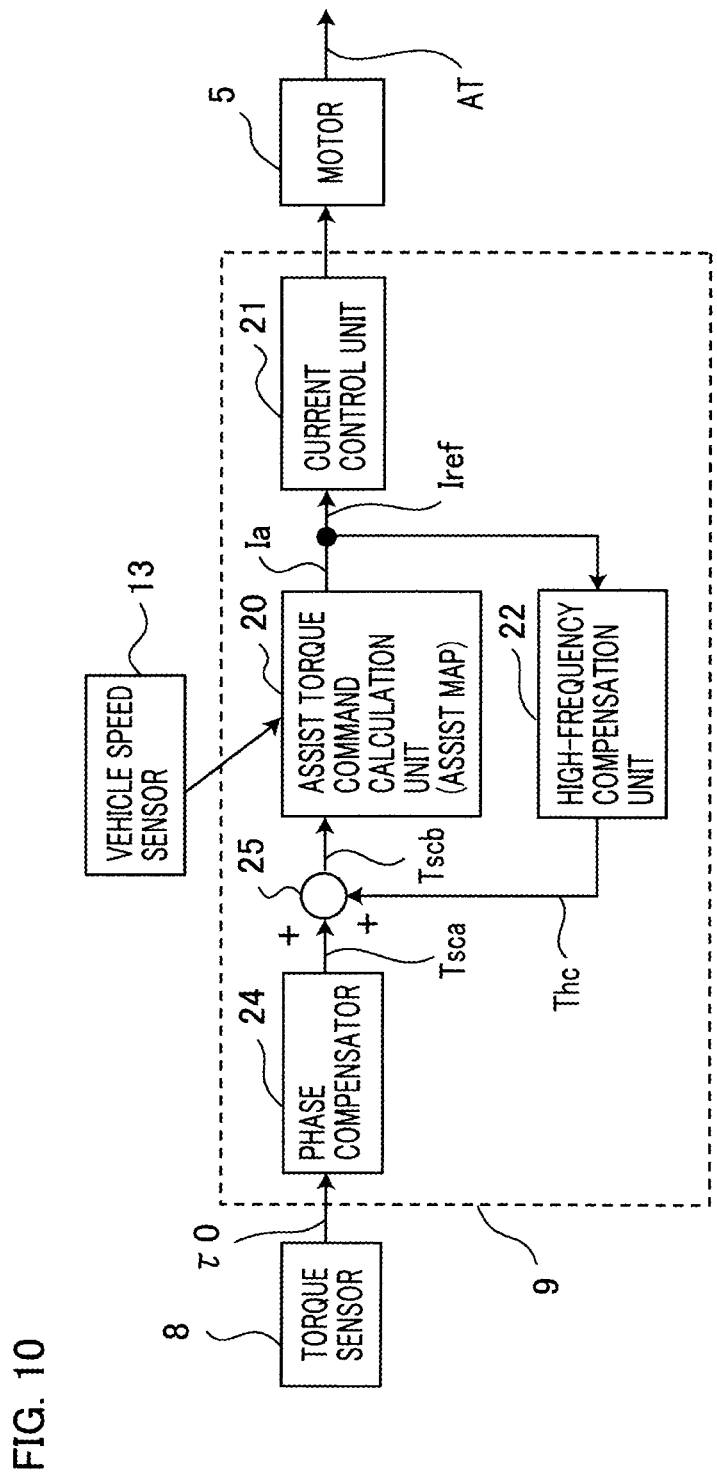
FIG. 10 is a block diagram representing the configuration of a control apparatus in an electric power steering apparatus according to Embodiment 2 of the present invention.

Next, an electric power steering apparatus according to Embodiment 2 of the present invention will be explained. FIG. 10 is a block diagram representing the configuration of a control apparatus in the electric power steering apparatus according to Embodiment 2 of the present invention. The differences from the configuration of foregoing Embodiment 1 are that the subtractor 23 is replaced by the adder 25 and that settings of the respective frequency characteristics of the phase compensator 24 and the high-frequency compensation unit 22 are changed. The other configurations are the same as those in Embodiment 1. In the following explanation, the differences from the configuration of Embodiment 1 will mainly be explained.

The phase compensator 24 performs phase compensation in which for the steering torque signal τ0 detected by the torque sensor 8, the high-frequency gain is decreased or increased, and then obtains the compensated steering torque signal Tsca. The phase compensator 24, referred to also as a phase compensator, has a phase-delay/advance compensation function of having a characteristic of phase-delay compensation for decreasing the gain crossover frequency of the one-round transfer function in a closed-loop system related to the assist torque AT and a frequency characteristic, represented in FIG. 11, for increasing the phase characteristic in the vicinity of the crossover frequency. That is to say, FIG. 11 is a bode chart representing a phase compensator in the electric power steering apparatus according to Embodiment 2 of the present invention; the ordinate denotes the phase [deg] and the gain [dB], and the abscissa denotes the frequency [Hz].

Figure 11:
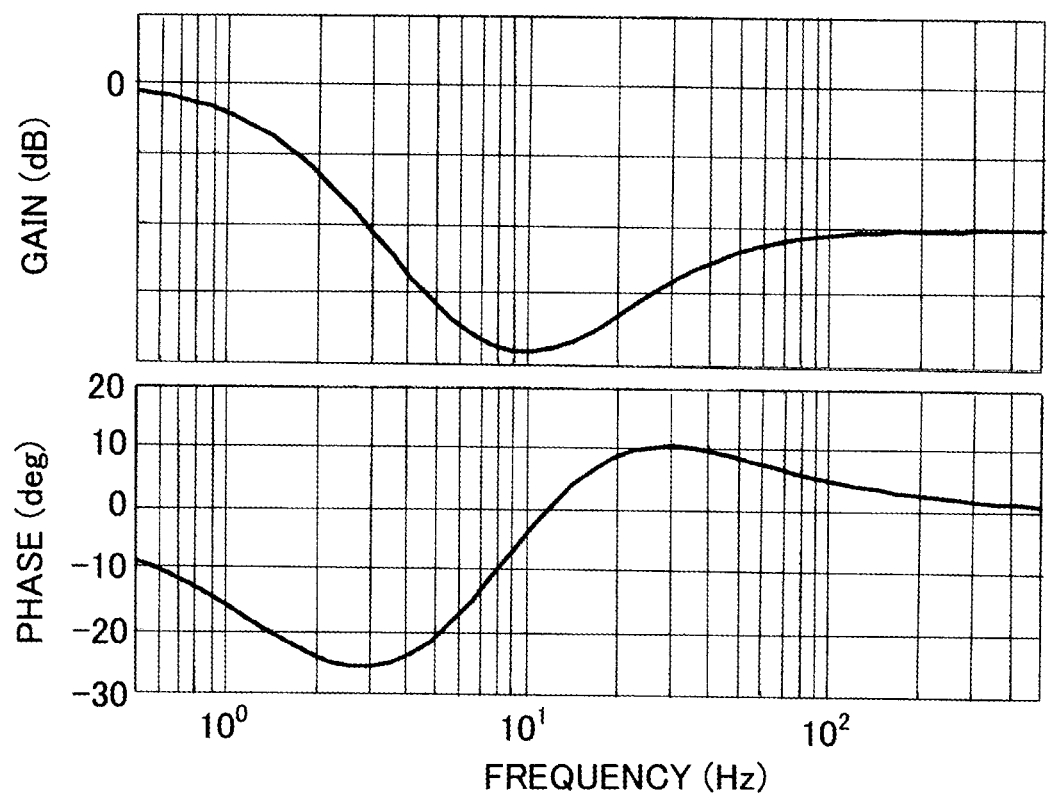
FIG. 11 is a bode chart representing a phase compensator in the electric power steering apparatus according to Embodiment 2 of the present invention.

As represented in FIG. 11, the phase advance amount is suppressed to a critical mass so that the gain in the high-frequency band is suppressed from increasing; specifically, the gain is suppressed to a gain that is smaller than the gain at a frequency of 0.5 [Hz] or lower. As a result, the control apparatus is prevented from wastefully amplifying high-frequency noise.

In FIG. 10, the adder 25 adds the high-frequency compensation signal Thc, explained in Embodiment 1, to the compensated steering torque signal Tsca, so that the compensated steering torque signal Tsca is corrected and then the corrected steering torque signal Tscb is obtained.

Next, there will be explained the feature related to the phase compensation that corresponds to the assist gradient, in the electric power steering apparatus, configured as described above, according to Embodiment 2 of the present invention. The high-frequency compensation signal Thc, which is a signal obtained by multiplying the high-frequency components of the assist torque command signal Ia by a gain, is positively fed back to the compensated steering torque signal Tsca, and then is inputted, as part of the corrected steering torque signal Tscb, to the assist map in such a way as to accompany the steering torque signal Tsca; thus, the high-frequency compensation signal Thc is amplified in accordance with the torque proportional gain, as the assist gradient that is an amplification factor at the operating point of an assist map, which is generally configured in a non-linear manner, included, as the high-frequency components, in the assist torque command signal Ia, and then is inputted again to the high-frequency compensation unit 22.

The high-frequency components of the compensated steering torque signal Tsca are positively fed back to the compensated steering torque signal Tsca itself, via the assist map and the high-frequency compensation unit 22, so that the high-frequency components are added to the compensated steering torque signal Tsca; thus, the characteristic from the compensated steering torque signal Tsca to the assist torque command signal Ia basically becomes a characteristic obtained by multiplying the phase-advance compensation characteristic by the assist gain. The phase-advance compensation characteristic can be changed in accordance with the assist gradient.

With regard to the high-frequency components of the compensated steering torque signal Tsca, the operating point of the assist map is determined depending on the low-frequency components thereof; in the case of the operating point P1 represented in FIG. 5, the high-frequency components of the assist torque command signal Ia takes a value obtained by multiplying the corrected steering torque signal Tscb by the assist gradient Ka1 and is again added, as the high-frequency compensation signal Thc, to the compensated steering torque signal Tsca so as to be repeatedly multiplied by the assist gradient Ka1. In the case of the operating point P2, the high-frequency components of the assist torque command signal Ia takes a value obtained by multiplying the corrected steering torque signal Tscb by the assist gradient Ka2, which is larger than the assist gradient Ka1. Accordingly, with regard to the high-frequency components of the compensated steering torque signal Tsca, the high-frequency compensation signal Thc becomes larger and hence the amount of addition by the adder 25 also becomes larger, as the assist gradient is larger; thus, the phase advance compensation effect from the compensated steering torque signal Tsca to the assist torque command signal Ia becomes large.

Figure 12:
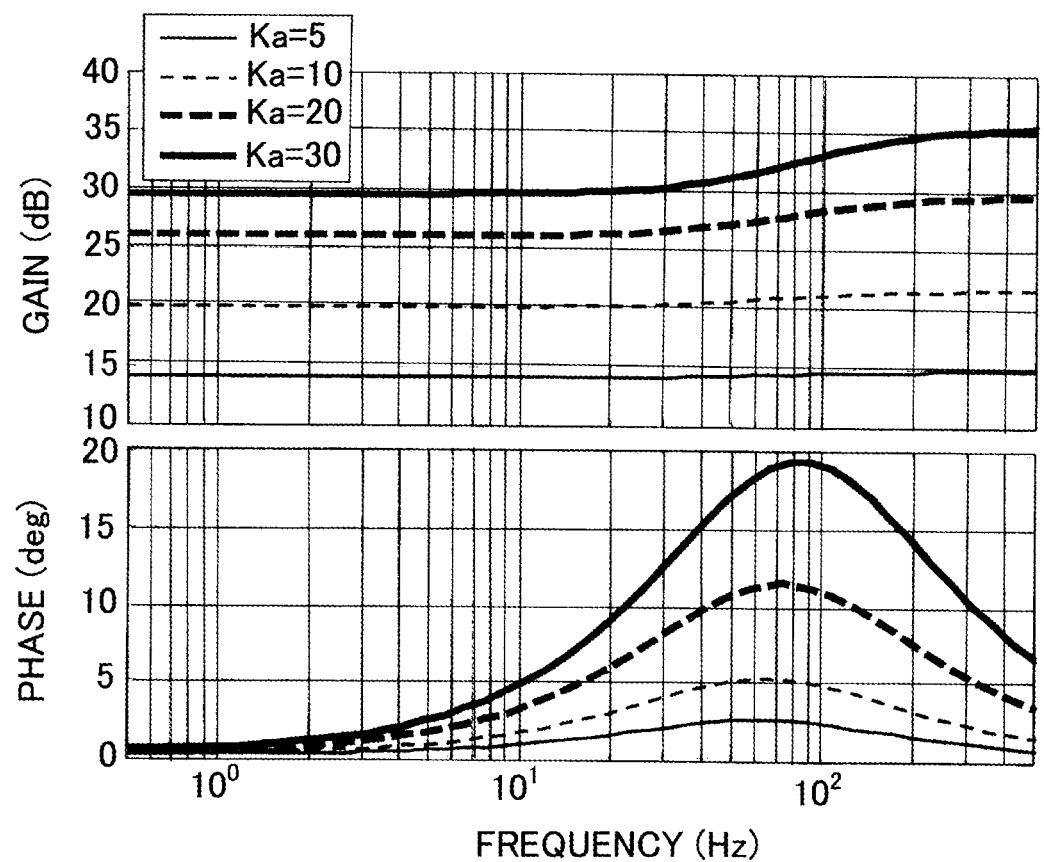
FIG. 12 is a bode chart representing the transfer characteristic from a steering torque signal to an assist torque command signal in the electric power steering apparatus according to Embodiment 2 of the present invention.

FIG. 12 is abode chart representing the transfer characteristic from a steering torque signal to an assist torque command signal in the electric power steering apparatus according to Embodiment 2 of the present invention; the ordinate denotes the phase [deg] and the gain [dB], and the abscissa denotes the frequency [Hz]. As represented in FIG. 12, in the low-frequency band of 1 [Hz] or lower, the magnitude of the gain characteristic takes a value the same as the assist gradient and increases, as the assist gradient increases. In contrast, in the high-frequency band, the gain increasing amount and the phase advance amount become larger, as the assist gradient are larger, in comparison with the case of the low-frequency band; thus, it can be seen that the phase advance compensation effect changes in accordance with the assist gradient. When the assist gradient is small, the gain increasing amount in the high-frequency band is larger than that in the low-frequency band; thus, there is provided a characteristic in which high-frequency noise is prevented from being amplified.

Figure 13:
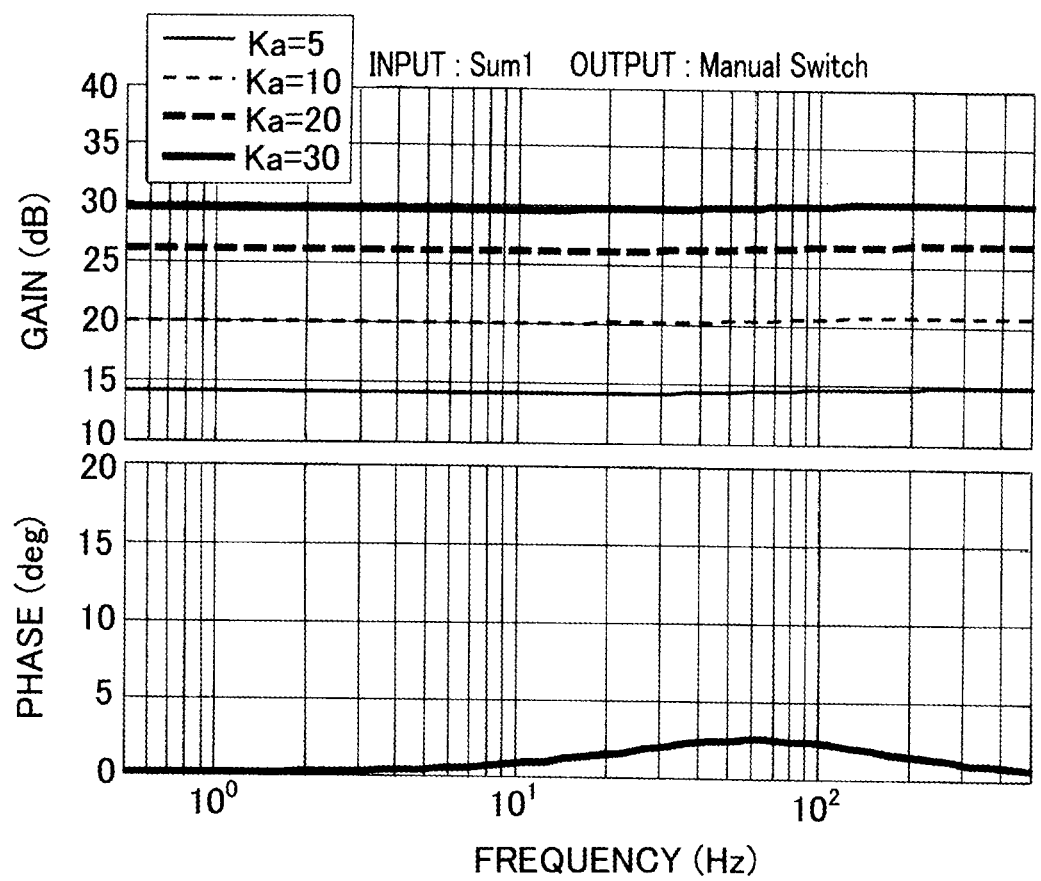
FIG. 13 is a bode chart representing the transfer characteristic from a steering torque signal to an assist torque command signal in the conventional electric power steering apparatus.

In contrast, in the conventional configuration, described above by use of FIG. 7, the phase compensator 40 having a fixed characteristic represented in FIG. 13 is utilized. That is to say, FIG. 13 is a bode chart representing the transfer characteristic from a steering torque signal to an assist torque command signal in the conventional electric power steering apparatus; the ordinate denotes the phase [deg] and the gain [dB], and the abscissa denotes the frequency [Hz]. In this example of the configuration of the conventional apparatus, the phase advance compensation effect from the compensated steering torque signal Tsca to the assist torque command signal Ia is obtained by use of the phase compensator 40. Accordingly, as represented in FIG. 13, the gain increasing amount and the phase advance amount in the high-frequency band in comparison with those in the low-frequency band become constant regardless of the assist gradient.

Next, when the assist gradient of the assist map is Ka, the transfer function from the compensated steering torque signal Tsca to the assist torque command signal Ia in the electric power steering apparatus according to Embodiment 2 of the present invention will be explained by use of a mathematical expression. The corrected steering torque signal Tscb obtained by positively feeding back the high-frequency compensation signal Thc to the compensated steering torque signal Tsca can be expressed by the equation (8) below.

$$Tscb = Tsca + Thc \quad (8)$$

By substituting the foregoing equations (2) and (4) for the equation (8) and rearranging it, the transfer function Ga(s) from the compensated steering torque signal Tsca to the assist torque command signal Ia can be expressed by the following equation.

$$Ga(s) = Ka \cdot (s + \omega h) / \{(1 - k \cdot Ka) \cdot s + \omega h\} \quad (9)$$

The frequency characteristic represented in FIG. 12 is exactly the one obtained by plotting the values of the equation (9); the denominator $\{(1-k \cdot Ka) \cdot s + \omega h\}$ of the transfer function Ga(s), in the equation (9), from the compensated steering torque signal Tsca to the assist torque command signal Ia includes the assist gradient Ka and the pole thereof can be expressed by the equation (10) below.

$$\omega h / (1 - k \cdot Ka) \quad (10)$$

Thus, it can be seen that the phase compensation characteristic from the compensated steering torque signal Tsca to the assist torque command signal Ia changes depending on the assist gradient Ka. Because the zero point of the numerator of the equation (9) is the cut-off frequency $\omega h$ of the high-pass filter 30 represented in FIG. 4 and is fixed, the break-point frequency, at the low-frequency side, of the phase-advance compensation characteristic is constant for the assist gradient.

The pole given by the equation (10) indicates the break-point frequency, at the high-frequency side, of the phase-advance compensation characteristic; the larger the assist gradient Ka is, the higher the break-point frequency becomes. Therefore, the phase compensation characteristic from the compensated steering torque signal Tsca to the assist torque command signal Ia has a feature that the larger the assist gradient Ka is, the larger the gain increasing amount and the phase advance amount in the high-frequency band become, in comparison with those in the low-frequency band.

Figure 14:
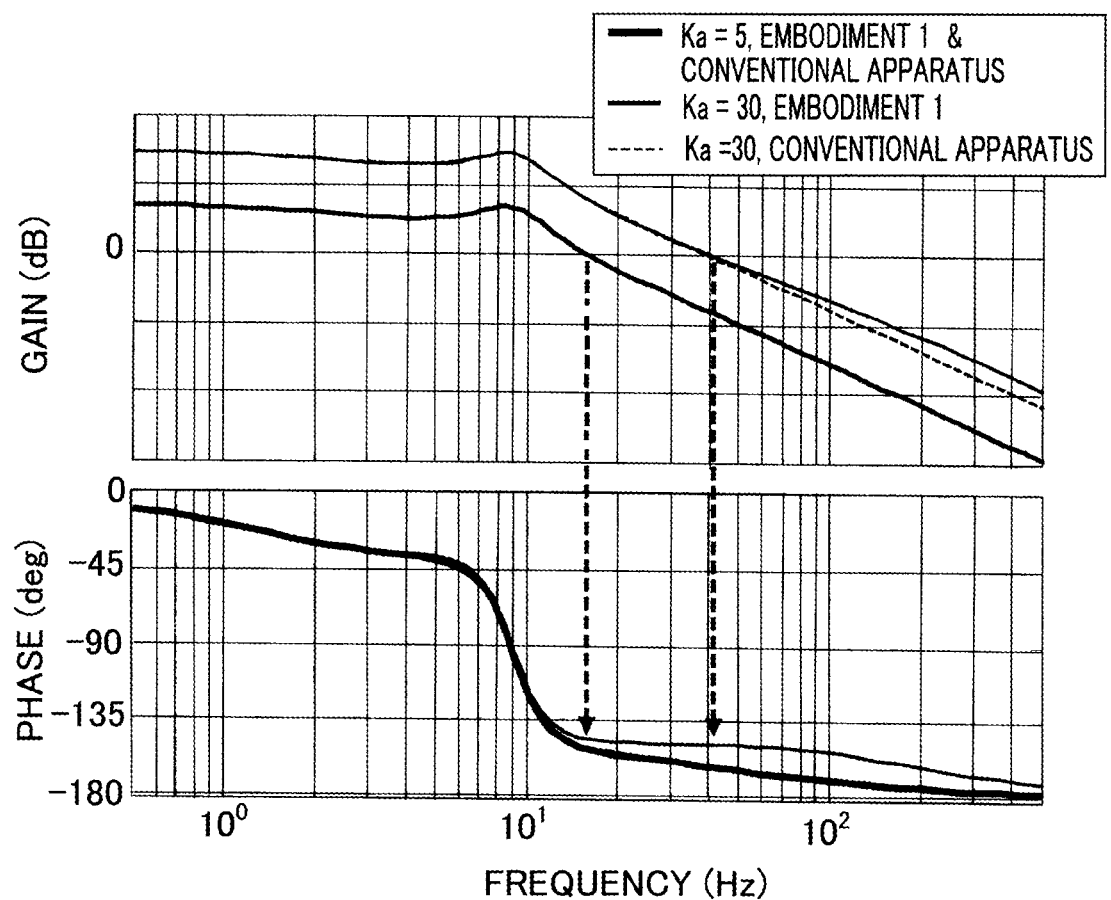
FIG. 14 is a bode chart representing, in a comparison manner, the respective open-loop transfer functions in the electric power steering apparatus according to Embodiment 2 of the present invention and the conventional electric power steering apparatus.

Next, the effect of the electric power steering apparatus according to Embodiment 2 of the present invention is explained by use of an open-loop transfer function in a closed-loop system related to the assist torque. FIG. 14 is a bode chart representing, in a comparison manner, the respective open-loop transfer functions in the electric power steering apparatus according to Embodiment 2 of the present invention and the conventional electric power steering apparatus; the ordinate denotes the phase [deg] and the gain [dB], and the abscissa denotes the frequency [Hz]. FIG. 14 represents the one-round transfer function in the configuration according to Embodiment 2 of the present invention and the one-round transfer function in the configuration of the conventional apparatus represented in FIGS. 7 and 13.

In FIG. 14, the thick solid line denotes the one-round transfer function according to the configuration of Embodiment 2 of the present invention and the one-round transfer function according to the configuration of the conventional apparatus at a time when the assist gradient Ka is 5; these one-round transfer functions are configured in such a way to have the same characteristic. As described above, the phase compensator 24 has a characteristic represented in FIG. 11, as phase-delay/advance compensation. The same applies to the configuration of the conventional apparatus in FIG. 7. The gain crossover frequency at a time when the assist gradient Ka is "5" is read as substantially 16 [Hz] from FIG. 9; the phase compensator 24 is configured in such a way that a phase advance amount is obtained at this frequency.

In the electric power steering apparatus according to Embodiment 2 of the present invention, the phase compensation characteristic from the compensated steering torque signal Tsca to the assist torque command signal Ia is configured in such a way that as represented in FIG. 12, the high-frequency gain is suppressed as much as possible from increasing at a time when the assist gradient Ka is "5" and that the phase advances by a critical mass. In the configuration of the conventional apparatus represented in FIG. 13, the phase compensation characteristic from the compensated steering torque signal Tsca to the assist torque command signal Ia is designed and configured in such a way as to be the same as the characteristic in the configuration of Embodiment 2 of the present invention at a time when the assist gradient Ka is "5".

As described above, in the one-round transfer function at a time when the assist gradient Ka is small, for example, "5", the phase at the gain crossover frequency is large, as represented in FIG. 14, and hence the phase margin is sufficiently secured. Moreover, as described above, the gain increasing amount of the control apparatus 9 in the high-frequency band is suppressed at a small value, in comparison with the gains increasing amount in the low-frequency band; thus, also in the one-round transfer characteristic, the gain increasing amount in the high-frequency band is suppressed at a small low-frequency band, and hence high-frequency noise can be suppressed.

Next, the one-round transfer function in the example of configuration of the conventional apparatus at a time when the assist gradient Ka is large, for example, "30" will be explained. Because in the configuration of the conventional apparatus, the phase compensation characteristic is constant for the assist gradient, the frequency characteristic of the control apparatus 9 is simply proportional to the assist gradient, and the one-round transfer function is also simply proportional to the assist gradient; thus, the gain chart in the configuration of the conventional apparatus shifts in parallel by an amount corresponding to the increase in the assist gradient, and the phase characteristic becomes constant without depending on the assist gradient. Accordingly, the one-round transfer function in the configuration example of conventional apparatus at a time when the assist gradient Ka is large, for example, "30" is represented by the narrow broken line in FIG. 14, and it can be seen that the phase margin at the gain crossover frequency is small.

The one-round transfer function in the apparatus according to Embodiment 2 of the present invention at a time when the assist gradient Ka is large, for example, "30" will be explained. With regard to the phase compensation characteristic from the compensated steering torque signal Tsca to the assist torque command signal Ia in the apparatus according to Embodiment 2 of the present invention, when the assist gradient is large, the phase advance amount is large, as represented in FIG. 12. Accordingly, with regard to the one-round transfer function, it can be seen that as represented by the thick black solid line in FIG. 14, the phase margin at the gain crossover frequency is sufficiently large.

As described above, in comparison with the case where the phase compensation characteristic in the configuration of the conventional apparatus is made to be optimum at a time when the assist gradient is small, the configuration according to Embodiment 2 of the present invention makes it possible to obtain an effect that while when the assist gradient is small, the stability margins such as the phase margin and the gain margin the same as those in the conventional apparatus are secured so that high-frequency noise is suppressed, the phase margin can be raised in comparison with the conventional apparatus when the assist gradient is large.

Moreover, when the phase compensation characteristic in the configuration of the conventional apparatus is designed in such a way as to be optimum at a time when the assist gradient is large, the high-frequency gain cannot sufficiently be reduced in the configuration of the conventional apparatus, when the assist gradient is small; thus, high-frequency noise is wastefully amplified; however, the configuration of Embodiment 2 of the present invention makes it possible that as the assist gradient is smaller, the increasing amount of the high-frequency gain is decreased more, in comparison with the low-frequency gain; thus, there can be obtained an effect that the high-frequency noise can be suppressed.

The control apparatus according to Embodiment 2 of the present invention includes the assist torque command calculation unit that outputs the assist torque command signal, and the high-frequency compensation unit that outputs the high-frequency compensation signal obtained by filtering the high-frequency components of the assist torque command signal and multiplying the filtered high-frequency components by a gain; the compensated steering torque signal obtained by positively feeding back the high-frequency compensation signal to the compensated steering torque signal is inputted to the assist torque command calculation unit, and then the assist torque command calculation unit outputs the assist torque command signal in accordance with the compensated steering torque signal. Thus, the frequency characteristic of the phase compensation characteristic from the compensated steering torque signal to the assist torque command signal can be changed in accordance with the assist gradient in the assist torque command calculation unit; as a result, there can be obtained an unprecedented prominent effect that in comparison with the ordinary phase compensator, of the conventional apparatus, that does not change in accordance with the assist gradient, not only the steering responsiveness and the stability can be raised, but also high frequency noise can be reduced.

Moreover, such an extremely simple configuration including the high-frequency compensation unit and the positive feedback makes it possible to obtain a prominent effect that the calculation amount is the same as that of the ordinary phase compensator, of the conventional apparatus, that does not change in accordance with the assist gradient, and hence the calculation amount is considerably reduced, in comparison with a lot of calculation such as successively calculating the assist gradient as in Patent Document 1.

Furthermore, in the case where as in Patent Document 2, the assist gradient is replaced by the steering torque signal, there has been a problem that the stability and the responsiveness are deteriorated at an operating point where the correlation between the assist gradient and the steering torque is low; however, the electric power steering apparatus according to Embodiment 2 of the present invention makes it possible to change the phase compensation characteristic in accordance with the assist gradient itself; thus, as a matter of course, the stability and the responsiveness are not deteriorated.

Because the electric power steering apparatus according to Embodiment 2 of the present invention is configured in such a way that there is provided the phase compensator 24 that outputs the compensated steering torque signal obtained by compensating the phase of the steering torque signal and in such a way that the high-frequency compensation signal is positively fed back to the phase-corrected steering torque signal, phase-delay/advance compensation can be configured by combining the phase-advance compensation characteristic, realized by the high-frequency compensation unit, from the compensated steering torque signal Tsca to the assist torque command signal Ia with the phase-delay/advance characteristic obtained through the phase compensator 24; thus, there can be obtained a prominent effect, which is unprecedented in the conventional apparatus, that while high-frequency noise is suppressed and the gain crossover frequency is lowered, the phase margin is appropriately secured in accordance with the assist gradient and hence the stability can be raised.

Embodiment 3

Figure 15:
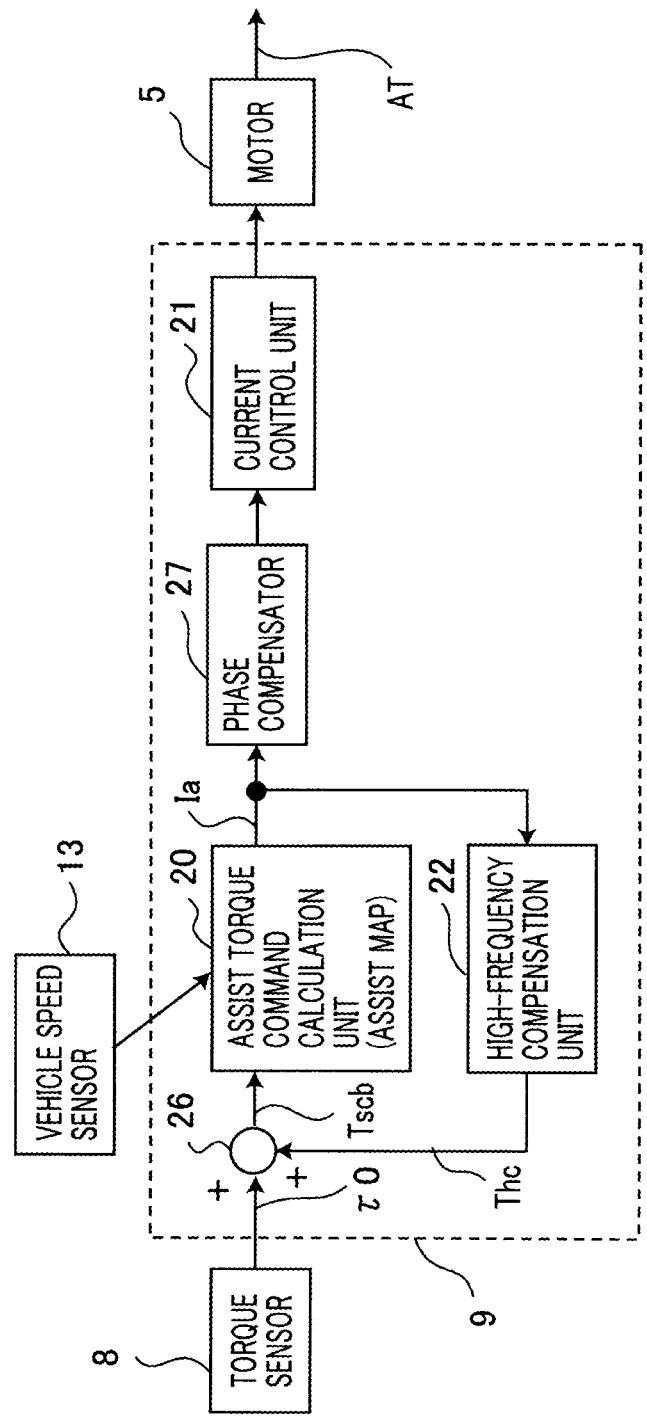
FIG. 15 is a block diagram representing the configuration of a control apparatus in an electric power steering apparatus according to Embodiment 3 of the present invention.

Next, an electric power steering apparatus according to Embodiment 3 of the present invention will be explained. FIG. 15 is a block diagram representing the configuration of a control apparatus in the electric power steering apparatus according to Embodiment 3 of the present invention. The difference from the configuration of foregoing Embodiment 2 is that the phase compensator 24 in Embodiment 2 is replaced by a phase compensator 27, as a second phase compensator, that is situated at a stage following the assist torque command calculation unit 20. An adder 26 is the same as the adder 25 in Embodiment 2. The other configurations are the same as those in Embodiment 2. In the following explanation, the difference from Embodiment 2 will mainly be explained.

In FIG. 15, the frequency characteristic of the phase compensator 27 is the same as that of the phase compensator 24, represented in FIG. 11, of Embodiment 2. Accordingly, the performance explained based on the frequency characteristic in Embodiment 2 can be applied to Embodiment 3 of the present invention. That is to say, the electric power steering apparatus according to Embodiment 3 of the present invention includes the assist torque command calculation unit 20 that outputs the assist torque command signal Ia, and the high-frequency compensation unit 22 that outputs the high-frequency compensation signal Thc obtained by filtering the high-frequency components of the assist torque command signal Ia and multiplying the filtered high-frequency components by a gain; the corrected steering torque signal Tscb obtained by positively feeding back the high-frequency compensation signal Thc to the steering torque signal τ0 is inputted to the assist torque command calculation unit 20, and then the assist torque command calculation unit 20 outputs the assist torque command signal Ia in accordance with the corrected steering torque signal Tscb.

Thus, the frequency characteristic of the phase compensation characteristic from the steering torque signal τ0 to the assist torque command signal Ia can be changed in accordance with the assist gradient in the assist torque command calculation unit 20; as a result, there can be obtained a prominent effect, which is unprecedented in conventional apparatuses, that in comparison with the ordinary phase compensator, of the conventional apparatus, that does not change in accordance with the assist gradient, not only the steering responsiveness and the stability can be raised, but also high frequency noise can be reduced.

The electric power steering apparatus according to Embodiment 3 of the present invention is characterized in that a phase compensator whose high-frequency gain is lower on the whole than that in the lower-frequency band and in which the phase delay in the low-frequency band is large, as represented in FIG. 11, is situated in a stage following the assist torque command calculation unit 20 as an assist map. Because such the gain decrease and the phase delay do not act on the steering torque signal τ0, the gain decrease and the phase delay of the corrected steering torque signal Tscb to be input to the assist map can be reduced; as a result, there is demonstrated an effect that the rise of the assist torque command signal Ia from the vicinity of zero of the assist map can be accelerated.

In the electric power steering apparatus according to Embodiment 3 of the present invention, the adder 26 adds the high-frequency compensation signal Thc to the steering torque signal τ0; however, it may be allowed that the adder 26 is changed as in Embodiment 1 so that the high-frequency compensation signal Thc is subtracted from the steering torque signal τ0; in this case, with regard to the frequency characteristic, there is obtained an effect the same as that obtained in Embodiment 1. In this situation, unlike foregoing Embodiment 1, the phase-advance compensation in Embodiment 3 of the present invention is realized by the phase compensator 27; thus, because before the phase advance, the effect of decreasing the high-frequency gain by the high-frequency compensation unit 22 and the subtractor 26 is provided to the steering torque signal τ0, there is demonstrated an effect that the high frequency noise is made to be one bit or lower so as to be zero, and hence the effect of reducing minute noise can be raised.

Because as described above, the electric power steering apparatus according to Embodiment 3 of the present invention is provided with the phase compensator 27 that compensates the phase of the assist torque command signal Ia and outputs the current command signal Iref, the phase-delay/advance compensation can be configured by combining the phase-advance compensation characteristic or the phase delay compensation characteristic, realized by the high-frequency compensation unit 22, from the corrected steering torque signal Tscb to the assist torque command signal Ia with the phase delay characteristic or the phase advance characteristic obtained through the phase compensator 27; thus, there can be obtained a prominent effect, which is unprecedented in the conventional apparatus, that while high-frequency noise is suppressed and the gain crossover frequency is lowered, the phase margin is appropriately secured in accordance with the assist gradient and hence the stability can be raised and that the rise of the assist torque command signal Ia is accelerated so that the steering responsiveness can be raised.

Embodiment 4

Figure 16:
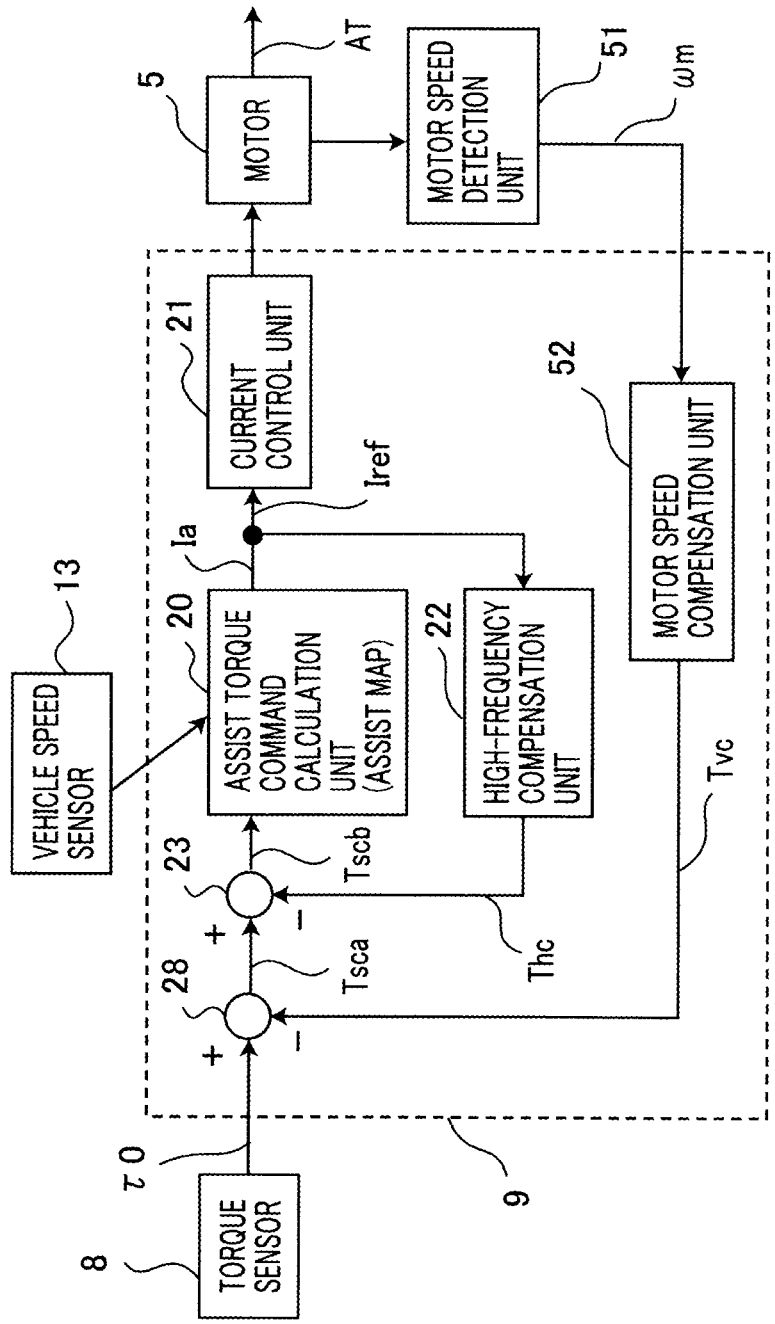
FIG. 16 is a block diagram representing the configuration of a control apparatus in an electric power steering apparatus according to Embodiment 4 of the present invention.

Next, an electric power steering apparatus according to Embodiment 4 of the present invention will be explained. FIG. 16 is a block diagram representing the configuration of a control apparatus in the electric power steering apparatus according to Embodiment 4 of the present invention. The difference between the electric power steering apparatus according to Embodiment 4 and the electric power steering apparatus according to foregoing Embodiment 1 is that instead of the phase compensator 24 in Embodiment 1, a motor speed compensation unit 52 as a motor speed compensator for correcting a motor speed signal detected by a motor speed detection unit 51 as a motor speed detector and a subtractor 28 are provided. The other configurations are the same as those in Embodiment 1. In the following explanation, the difference from Embodiment 1 will mainly be explained.

In FIG. 16, the motor speed compensation unit 52 receives a motor speed signal ωm, which is a motor rotation speed, detected by the motor speed detection unit 51, and outputs a motor speed corrected signal Tvc, which is corrected by a high-pass filter 61, a low-pass filter 62, and a gain 63, as described later. The motor speed corrected signal Tvc is subtracted from the steering torque signal τ0 in the subtractor 28 so that motor speed compensation is performed; then, the motor speed corrected signal Tvc becomes the compensated steering torque signal Tsca. In the subtractor 23, the high-frequency compensation signal Thc is subtracted from the compensated steering torque signal Tsca, so that the compensated steering torque signal Tsca is corrected and becomes the corrected steering torque signal Tscb.

Figure 17:
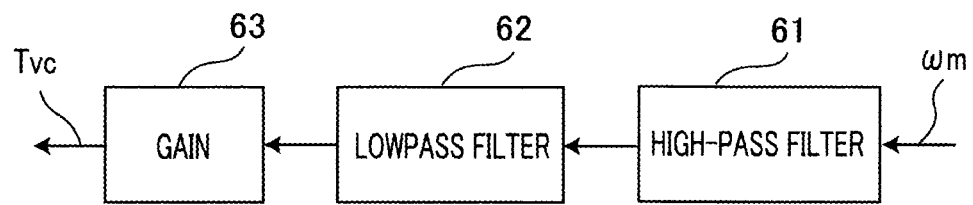
FIG. 17 is a block diagram representing the configuration of a motor speed compensation unit in the electric power steering apparatus according to each of Embodiments 4 and 5 of the present invention.

FIG. 17 is a block diagram representing the configuration of the motor speed compensation unit in the electric power steering apparatus according to each of Embodiments 4 and 5 of the present invention. As represented in FIG. 17, the motor speed compensation unit 52 represented in FIG. 16 includes the high-pass filter 61, the low-pass filter 62, and the gain 63. The high-pass filter 61 applies cut-off processing to the low-frequency band so as to reduce the steering-frequency components of the motor speed signal ωm, thereby compensating the motor speed signal; then, the high-pass filter 61 outputs the compensated motor speed signal. The high-pass filter 61 is formed in such a way as to reduce the component of a frequency at which a driver performs steering; it is required that the cut-off frequency thereof is higher than the frequency at which the driver performs steering. In general, the frequency at which a driver performs steering is substantially 3 to 5 [Hz] or lower.

In order to suppress the vibration component having the gain crossover frequency, which is an inherent vibration frequency including the feedback by the control apparatus 9, the high-pass filter 61 permits the motor speed signal ωm to pass in a band in the vicinity of the gain crossover frequency. Accordingly, the cut-off frequency of the high-pass filter 61 is set to a frequency that is the same as or higher than a frequency at which a driver performs steering and that is lower than the gain crossover frequency of the one-round transfer function of a closed-loop system related to the assist torque. Specifically, the cut-off frequency of the high-pass filter 61 is from 3 [Hz] to 40 [Hz]; it is preferably 5 [Hz] to 30 [Hz]. This makes it possible that while the feeling of viscosity to steering is suppressed, the vibration components caused by the closed-loop system related to the assist torque is also suppressed.

The low-pass filter 62 applies cut-off processing to the high-frequency band of the motor speed signal outputted by the high-pass filter 61 so as to reduce the high-frequency noise components of the motor speed signal, and then outputs the motor speed signal, as a compensated motor speed signal Svc. Because the high-pass filter 61 reduces the high-frequency noise components of the motor speed signal, it is required that the cut-off frequency thereof is the same as or lower than the frequencies of the high-frequency noise components.

The gain 63, which is the feedback gain of the motor-speed feedback, multiplies the compensated motor speed signal Svc by a proportional gain so as to calculate the motor speed corrected signal Tvc. In foregoing Embodiment 1, in order to obtain an effect of advancing the phase of the steering torque signal τ0, the steering torque signal τ0 is phase-compensated by use of the phase compensator 24 having the phase-advance compensation characteristic represented in FIG. 3. In the configuration according to Embodiment 4 of the present invention, instead of the use of the phase compensator 24, the motor speed corrected signal Tvc from the motor speed compensation unit 52 is subtracted from the steering torque signal τ0 so that the steering torque signal τ0 receives the phase advance effect and becomes the compensated steering torque signal Tsca.

Here, there will be explained that the motor speed corrected signal Tvc provides an effect the same as that of the phase compensator 24. As a matter of course, the steering torque and the motor rotation angle are different from each other in terms of the responsiveness in the low-frequency band in the vicinity of the steering frequency; however, the low-frequency band is eliminated by the high-pass filter 61. In the frequency band above the inherent vibration frequency in the vicinity of substantially 10 [Hz], which is determined by the motor and the rigidity of the torque sensor, the steering torque has a phase characteristic the same as the inversed sign of the motor rotation angle; the gain characteristic is the same as the one obtained by multiplying the motor rotation angle by the rigidity of the torque sensor.

Accordingly, the motor speed signal ωm has a characteristic close to the differential value of the steering torque. Therefore, by subtracting the motor speed corrected signal Tvc, obtained by multiplying the motor speed signal ωm by the gain, from the steering torque signal τ0, the phase advance effect, at the frequencies in the vicinity of 35 [Hz], of the foregoing phase compensator 24 can be obtained. When its cut-off frequency is set to a value the same as the break-point frequency, in the high-frequency band, of the phase compensator 24, the low-pass filter 62 can obtain a characteristic that is exactly the same as that of the phase compensator 24.

By way of the subtractor 28, the motor speed corrected signal Tvc accompanying the steering torque signal τ0 is inputted to the assist torque command calculation unit 20; thus, the motor speed corrected signal Tvc undergoes the effect of the assist gradient, as is the case with the output of the phase compensator 24. Also from this point, it can be seen that a characteristic the same as that of the phase compensator 24 can be obtained.

The motor speed compensation unit 52 feeds back a signal at the post-stage side of the assist map to the assist map. There will be provided an additional explanation that because in contrast to the high-frequency compensation unit 22 that feeds back a signal inside the control apparatus 9, the motor speed compensation unit 52 feeds back a motor rotation speed, which is a response of the control subject, it is not made possible to obtain such a phase compensation effect, capable of changing in accordance with the assist gradient, as the high-frequency compensation unit 22 provides.

In the electric power steering apparatus according to foregoing Embodiment 4, the corrected signal Tvc, obtained by correcting the motor speed signal ωm from the motor speed detection unit 51 that detects the rotation speed of a rotor shaft of the motor, is negatively fed back to the steering torque signal τ0; thus, phase-delay/advance compensation can be configured by combining the phase delay compensation characteristic, realized by the high-frequency compensation unit 22, from the compensated steering torque signal Tsca to the assist torque command signal Ia with the phase advance characteristic obtained through negative feedback of the corrected signal Tvc obtained by correcting the motor speed signal; therefore, the stability can be raised by lowering the gain crossover frequency so as to improve the phase margin.

In Embodiment 4 of the present invention, the phase compensator 24 is not utilized; however, it may be allowed that the phase compensator 24, in Embodiment 1, that compensates the phase of the steering torque or the phase compensator 27, in Embodiment 3, that compensates the phase of the assist torque is combined with the negative feedback, in Embodiment 4, of the corrected signal obtained by correcting the motor speed signal; in that case, the gain and the like may be adjusted so that the phase compensator and the motor speed compensation unit share and realize the phase advance effect. As a result, the respective amplification amounts of the high-frequency components of the steering torque signal and the high-frequency components of the motor speed can be reduced; thus, high-frequency noise can be scattered and hence high-frequency sound and vibration can be reduced. Moreover, there can be obtained an unprecedented prominent effect that in comparison with the conventional ordinary phase compensator that does not change in accordance with the assist gradient, the steering responsiveness and the stability can be raised.

Embodiment 5

Figure 18:
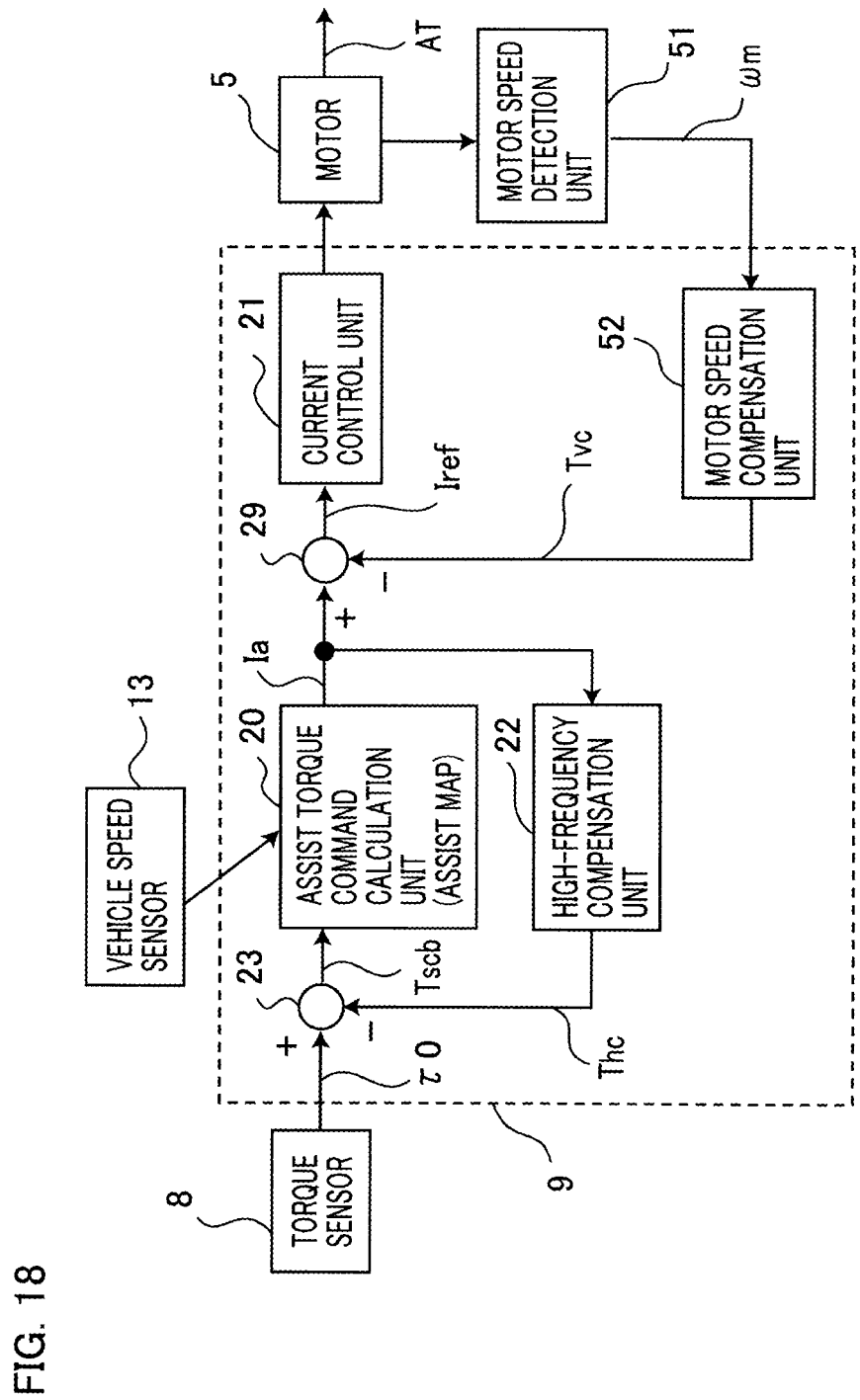
FIG. 18 is a block diagram representing the configuration of a control apparatus in the electric power steering apparatus according to Embodiment 5 of the present invention and FIG. 19 shows an example of hardware of the control apparatus in the electric power steering apparatus according to each of Embodiments 1 through 5 of the present invention.

Next, an electric power steering apparatus according to Embodiment 5 of the present invention will be explained. FIG. 18 is a block diagram representing the configuration of a control apparatus in the electric power steering apparatus according to Embodiment 5 of the present invention. The difference between the electric power steering apparatus according to Embodiment 5 of the present invention and the electric power steering apparatus according to foregoing Embodiment 4 is that in the case of Embodiment 5 of the present invention, there is provided a subtractor 29 that subtracts the motor speed corrected signal Tvc outputted from the motor speed compensation unit 52 from the assist torque command signal Ia; the other configurations are the same as those in Embodiment 4. In the following explanation, the difference will mainly be explained.

The subtractor 29 subtracts the motor speed corrected signal Tvc from the assist torque command signal Ia and outputs a corrected assist torque command signal that becomes the motor current command signal Iref. The configuration of the motor speed compensation unit 52 is the same as the configuration of the motor speed compensation unit 52 in Embodiment 4; only the setting value of the gain 63 is different. Because in the configuration of Embodiment 5, the motor speed corrected signal Tvc does not pass through the assist torque command calculation unit 20 and hence the amplification effect through the assist gradient is not provided, the gain 63 is set to a value larger than that in Embodiment 4. As a result, even when the assist gradient is large, the same phase advance effect can be obtained.

In the electric power steering apparatus according to foregoing Embodiment 5 of the present invention, the motor speed corrected signal Tvc, obtained by correcting the motor speed signal ωm from the motor speed detection unit 51 that detects the rotation speed of the rotor shaft of the motor, is negatively fed back to the assist torque command signal Ia; thus, phase-delay/advance compensation can be configured by combining the phase delay compensation characteristic, realized by the high-frequency compensation unit 22, from the compensated steering torque signal Tsca to the assist torque command signal Ia with the phase advance characteristic obtained through negative feedback of the motor speed corrected signal Tvc obtained by correcting the motor speed signal; therefore, there can be obtained a prominent effect, which is unprecedented in conventional apparatuses, that the stability can be raised by lowering the gain crossover frequency so as to increase the phase margin. Moreover, because even when the assist gradient is substantially zero, the phase advance effect provided by the motor speed corrected signal can be expected, the disturbance suppression and the stabilization effect can be raised.

The present invention is not limited to the respective electric power steering apparatuses according to foregoing Embodiments 1 through 5; in the scope within the spirits of the present invention, the respective configurations of Embodiments 1 through 5 can appropriately be combined with each other, can partially be modified, or can partially be omitted.

INDUSTRIAL APPLICABILITY

An electric power steering apparatus according to the present invention can be applied to the steering system of a vehicle such as an automobile and, eventually, can be utilized in the automobile industry.

DESCRIPTION OF REFERENCE NUMERALS

1: steering wheel
2: steering shaft
3, 4: wheel
12: rack-and-pinion gear
5: motor
7: speed reduction gear
8: torque sensor
9: control apparatus
11: power source
13: vehicle speed sensor
20: assist torque command calculation unit
21: current control unit
22: high-frequency compensation unit
23: subtractor
24: 1st phase compensator
27: 2nd phase compensator
31, 63: gain
61: high-pass filter
62: low-pass filter
τ0: steering torque signal
Vx: vehicle speed signal
Iref: motor current command signal
Ia: assist torque command signal
Tsca: compensated steering torque signal
Tscb: corrected steering torque signal Thc: high-frequency compensation signal
HPF(s): first-order filter
ωh: cut-off frequency
s: Laplace operator
AT: assist torque
ωm: motor speed signal
Tvc: motor speed corrected signal

The invention claimed is:

1. An electric power steering apparatus comprising:
a motor that outputs assist torque, based on a steering torque signal from a torque sensor for detecting steering torque; and
a control apparatus to control the assist torque of the motor,
wherein the control apparatus includes
an assist torque command calculator to calculate and output an assist torque command signal for making the motor generate the assist torque, and
a high-frequency compensator to output a high-frequency compensation signal obtained by filtering high-frequency components of the assist torque command signal and multiplying the filtered high-frequency components by a gain,
wherein the assist torque command calculator receives a corrected steering torque signal produced by negatively or positively feeding back the high-frequency compensation signal to the steering torque signal and then outputs the assist torque command signal in accordance with the inputted corrected steering torque signal.

2. The electric power steering apparatus according to claim 1, further including a first phase compensator that compensates the phase of the steering torque signal and then outputs a compensated steering torque signal, wherein the high-frequency compensation signal outputted from the high-frequency compensation unit is negatively or positively fed back to the compensated steering torque signal.

3. The electric power steering apparatus according to claim 1, wherein there is provided a second phase compensator that compensates the phase of the assist torque command signal outputted from the assist torque command calculation unit and then outputs a compensated assist torque command signal.

4. The electric power steering apparatus according to claim 1, further including a motor speed detector to detect a rotation speed of a rotor shaft of the motor, wherein a motor speed corrected signal generated based on a motor speed signal from the motor speed detector is negatively fed back to the steering torque signal.

5. The electric power steering apparatus according to claim 1, further including a motor speed detector to detect a rotation speed of a rotor shaft of the motor, wherein a motor speed corrected signal generated based on a motor speed signal from the motor speed detector is negatively fed back to the assist torque command signal.

6. The electric power steering apparatus according to claim 2, further including a motor speed detector to detect a rotation speed of a rotor shaft of the motor, wherein a motor speed corrected signal generated based on a motor speed signal from the motor speed detector is negatively fed back to the steering torque signal.

7. The electric power steering apparatus according to claim 3, further including a motor speed detector to detect a rotation speed of a rotor shaft of the motor, wherein a motor speed corrected signal generated based on a motor speed signal from the motor speed detector is negatively fed back to the steering torque signal.

8. The electric power steering apparatus according to claim 2, further including a motor speed detector to detect a rotation speed of a rotor shaft of the motor, wherein a motor speed corrected signal generated based on a motor speed signal from the motor speed t detector is negatively fed back to the assist torque command signal.

9. The electric power steering apparatus according to claim 3, further including a motor speed detector to detect a rotation speed of a rotor shaft of the motor, wherein a motor speed corrected signal generated based on a motor speed signal from the motor speed detector is negatively fed back to the assist torque command signal.

* * * * *